(12) United States Patent
Lantz et al.

(10) Patent No.: US 7,893,636 B2
(45) Date of Patent: Feb. 22, 2011

(54) MOBILE MACHINE WITH ONE OR MORE ELECTRIC PROPULSION MOTORS

(75) Inventors: Kevin A. Lantz, Washington, IL (US); Jeffrey Holt Wright, Edelstein, IL (US); Roy Christopher Fonseca, East Peoria, IL (US)

(73) Assignee: Progress Rail Services Corp, Albertville, AL (US)

( * ) Notice: Subject to any disclaimer, the term of this patent is extended or adjusted under 35 U.S.C. 154(b) by 366 days.

(21) Appl. No.: 11/979,209

(22) Filed: Oct. 31, 2007

(65) Prior Publication Data

US 2009/0108778 A1 Apr. 30, 2009

(51) Int. Cl.
*H02P 5/46* (2006.01)

(52) U.S. Cl. .......................... 318/105; 318/34; 318/49; 318/50; 318/51; 318/150

(58) Field of Classification Search .................. 318/34, 318/105, 150, 49–51
See application file for complete search history.

(56) References Cited

U.S. PATENT DOCUMENTS

| | | | |
|---|---|---|---|
| 611,089 A | 9/1898 | von Zweigbergk | |
| 1,860,523 A | 5/1932 | Austin et al. | |
| 2,266,326 A | 12/1941 | Lillquist | |
| 2,383,813 A | 8/1945 | Ogden | |
| 2,419,178 A | 4/1947 | Strong | |
| 2,703,845 A | 3/1953 | Stamm | |
| 2,658,174 A | 11/1953 | Warrick | |
| 2,700,123 A | 1/1955 | Clark | |
| 2,913,650 A | 11/1959 | Lichtenfels | |
| 3,842,316 A | 10/1974 | Godinez et al. | |
| 3,851,232 A * | 11/1974 | Chirgwin | 318/150 |
| 4,066,933 A * | 1/1978 | Pham et al. | 318/60 |
| 4,453,111 A * | 6/1984 | Acker | 318/111 |
| 4,658,189 A * | 4/1987 | Trusock | 318/52 |
| 4,900,944 A | 2/1990 | Donnelly | |
| 6,615,118 B2 | 9/2003 | Kumar | |
| 6,659,571 B2 * | 12/2003 | Herrmann | 303/152 |
| 7,131,614 B2 | 11/2006 | Kisak et al. | |
| 2005/0010338 A1 | 1/2005 | Kraeling et al. | |
| 2005/0251299 A1 | 11/2005 | Donnelly et al. | |
| 2006/0282199 A1 | 12/2006 | Daum et al. | |

* cited by examiner

*Primary Examiner*—Walter Benson
*Assistant Examiner*—David S Luo
(74) *Attorney, Agent, or Firm*—Finnegan, Henderson, Farabow, Garrett & Dunner LLP

(57) ABSTRACT

A mobile machine may include one or more generator units, a plurality of electric propulsion motors, and a power-transfer system operable to transfer electricity from one or more of the generator units to one or more of the electric propulsion motors. The mobile machine may also include power-system controls that control the connection of the one or more electric propulsion motors to the power-transfer system. The power-system controls may selectively use a first motor-connection strategy for controlling when one or more groups of the electric propulsion motors are connected to the power-transfer system in series, and the power-system controls may selectively use a second motor-connection strategy for controlling when one or more groups of the electric propulsion motors are connected to the power-transfer system in series.

19 Claims, 12 Drawing Sheets

| Quantity of Electric Current Required by 1st Set of One or More Electric Power Loads (amps) | Include 1st Priority Generator Unit in 1st Set of One or More Generator Units? | Quantity of Electric Current Generated with 1st Priority Generator Unit for 1st Set of One or More Electric Power Loads (amps) | Include 2nd Priority Generator Unit in 1st Set of One or More Generator Units? | Quantity of Electric Current Generated with 2nd Priority Generator Unit for 1st Set of One or More Electric Power Loads (amps) | Include 3rd Priority Generator Unit in 1st Set of One or More Generator Units? | Quantity of Electric Current Generated with 3rd Priority Generator Unit for 1st Set of One or More Electric Power Loads (amps) |
|---|---|---|---|---|---|---|
| 25 | Yes | 25 | No | 0 | No | 0 |
| 250 | Yes | 250 | No | 0 | No | 0 |
| 750 | Yes | 750 | No | 0 | No | 0 |
| 1,300 | Yes | 1,300 | Yes | 0 | No | 0 |
| 2,000 | Yes | 1,250 | Yes | 750 | No | 0 |
| 2,600 | Yes | 1,300 | Yes | 1,300 | No | 0 |
| 3,300 | Yes | 1,500 | Yes | 1,500 | Yes | 300 |
| 4,000 | Yes | 1,500 | Yes | 1,500 | Yes | 1,000 |
| 4,500 | Yes | 1,500 | Yes | 1,500 | Yes | 1,500 |

FIG. 3A

| Quantity of Electric Current Required by 2nd Set of One or More Electric Power Loads (amps) | Include 1st Priority Generator Unit in 2nd Set of One or More Generator Units? | Quantity of Electric Current Generated with 1st Priority Generator Unit for 2nd Set of One or More Electric Power Loads (amps) | Include 2nd Priority Generator Unit in 2nd Set of One or More Generator Units? | Quantity of Electric Current Generated with 2nd Priority Generator Unit for 2nd Set of One or More Electric Power Loads (amps) | Include 3rd Priority Generator Unit in 2nd Set of One or More Generator Units? | Quantity of Electric Current Generated with 3rd Priority Generator Unit for 2nd Set of One or More Electric Power Loads (amps) |
|---|---|---|---|---|---|---|
| 25 | Yes | 25 | No | 0 | No | 0 |
| 250 | Yes | 250 | No | 0 | No | 0 |
| 750 | Yes | 750 | No | 0 | No | 0 |
| 1,300 | Yes | 1,300 | Yes | 0 | No | 0 |
| 2,000 | Yes | 1,250 | Yes | 750 | No | 0 |
| 2,600 | Yes | 1,300 | Yes | 1,300 | No | 0 |
| 3,300 | Yes | 1,500 | Yes | 1,500 | Yes | 300 |
| 4,000 | Yes | 1,500 | Yes | 1,500 | Yes | 1,000 |
| 4,500 | Yes | 1,500 | Yes | 1,500 | Yes | 1,500 |

FIG. 3B

| Aggregate Quantity of Power Required by 1st and 2nd Sets of One or More Electric Power Loads (kW) | Include 1st Priority Generator Unit in 3rd Set of One or More Generator Units? | Quantity of Electric Power Supplied by 1st Priority Generator Unit (kW) | Include 2nd Priority Generator Unit in 3rd Set of One or More Generator Units? | Quantity of Electric Power Supplied by 2nd Priority Generator Unit (kW) | Include 3rd Priority Generator Unit in 3rd Set of One or More Generator Units? | Quantity of Electric Power Supplied by 3rd Priority Generator Unit (kW) |
|---|---|---|---|---|---|---|
| 10 | Yes | 10 | No | 0 | No | 0 |
| 75 | Yes | 75 | No | 0 | No | 0 |
| 250 | Yes | 250 | No | 0 | No | 0 |
| 440 | Yes | 440 | Yes | 0 | No | 0 |
| 650 | Yes | 400 | Yes | 250 | No | 0 |
| 875 | Yes | 450 | Yes | 425 | No | 0 |
| 1,100 | Yes | 500 | Yes | 500 | Yes | 100 |
| 1,350 | Yes | 500 | Yes | 500 | Yes | 350 |
| 1,500 | Yes | 500 | Yes | 500 | Yes | 500 |

MOBILE MACHINE WITH ONE OR MORE ELECTRIC PROPULSION MOTORS

TECHNICAL FIELD

The present disclosure relates to mobile machines and, more particularly, to mobile machines that have one or more electric propulsion motors.

BACKGROUND

Many mobile machines have one or more electric propulsion motors. Some mobile machines have one or more generator units that generate electricity, a plurality of electric propulsion motors, and a power-transfer system for transferring electricity from one or more of the generator units to one or more of the electric propulsion motors. Some such electric machines have a plurality of the electric propulsion motors connected to the power-transfer system in series, which may provide certain benefits. Other electric machines have all of their electric propulsion motors connected to the power-transfer system in parallel, which may provide other benefits.

Leaving the electric propulsion motors connected to the power-transfer system in the same manner at all times may involve compromises. In some circumstances, the benefits associated with connecting electric propulsion motors in series may provide a greater performance advantage than the benefits associated with connecting the electric propulsion motors in parallel. In other circumstances, the benefits associated with connecting the electric propulsion motors in parallel may provide a greater performance advantage than the benefits associated with connecting the electric propulsion motors in series.

U.S. Pat. No. 2,658,174 to Warrick et al. ("the '174 patent") discloses automatically switching between series and parallel connection of traction motors during operation of a locomotive. The '174 patent discloses an electric generator, two pairs of electric propulsion motors, and a circuit for supplying electricity from the electric generator to the electric propulsion motors. The circuit includes a pair of switches operable to connect each pair of electric propulsion motors in series and a pair of switches operable to connect each pair of electric propulsion motors in parallel. For all operating circumstances, the '174 patent discloses one method of controlling whether each pair of electric propulsion motors is connected in series or in parallel. Specifically, the '174 patent discloses that a control relay always triggers a transition between series connection and parallel connection in response to one particular combination of voltage and electric current supplied by the electric generator.

Although the '174 patent discloses automatically switching between series and parallel connection of electric propulsion motors during operation, certain disadvantages persist. For example, using the same strategy in all circumstances to control whether the traction motors are connected in series or parallel may involve compromises.

The mobile machine and methods of the present disclosure solve one or more of the problems set forth above.

SUMMARY OF THE INVENTION

One disclosed embodiment relates to a mobile machine. The mobile machine may include one or more generator units, a plurality of electric propulsion motors, and a power-transfer system operable to transfer electricity from one or more of the generator units to one or more of the electric propulsion motors. The mobile machine may also include power-system controls that control the connection of the one or more electric propulsion motors to the power-transfer system. The power-system controls may selectively use a first motor-connection strategy for controlling when one or more groups of the electric propulsion motors are connected to the power-transfer system in series, and the power-system controls may selectively use a second motor-connection strategy for controlling when one or more groups of the electric propulsion motors are connected to the power-transfer system in series.

Another embodiment relates to a method of operating a mobile machine. The method may include generating electricity with one or more generator units. The method may also include supplying electricity from one or more of the generator units to a first electric propulsion motor and a second electric propulsion motor of the mobile machine. Additionally, the method may include controlling whether the first electric propulsion motor and the second electric propulsion motor are connected in series or in parallel based at least in part on the location of the mobile machine.

A further embodiment relates to a method of operating a mobile machine. The method may include selectively generating electricity with one or more of a plurality of generator units of the mobile machine. This may include selectively using a first generator-control strategy to control which of the generator units run, which may include refraining from running all of the generator units at any time when using the first generator-control strategy. Selectively generating electricity with one or more of the plurality of generator units may also include selectively using a second generator-control strategy to control which of the generator units run, which may include running all of the generator units in at least some circumstances when using the second generator-control strategy. The method may also include selectively supplying electricity from one or more of the generator units to one or more of the electric propulsion motors of the mobile machine.

BRIEF DESCRIPTION OF THE DRAWINGS

FIG. 3A is a chart illustrating one embodiment of a lookup table for use in a control method according to the present disclosure;

FIG. 3B is a chart illustrating one embodiment of another lookup table for use in a control method according to the present disclosure; and FIG. 3C is a chart illustrating one embodiment of another lookup table for use in a control method according to the present disclosure.

DETAILED DESCRIPTION

Figure 1:
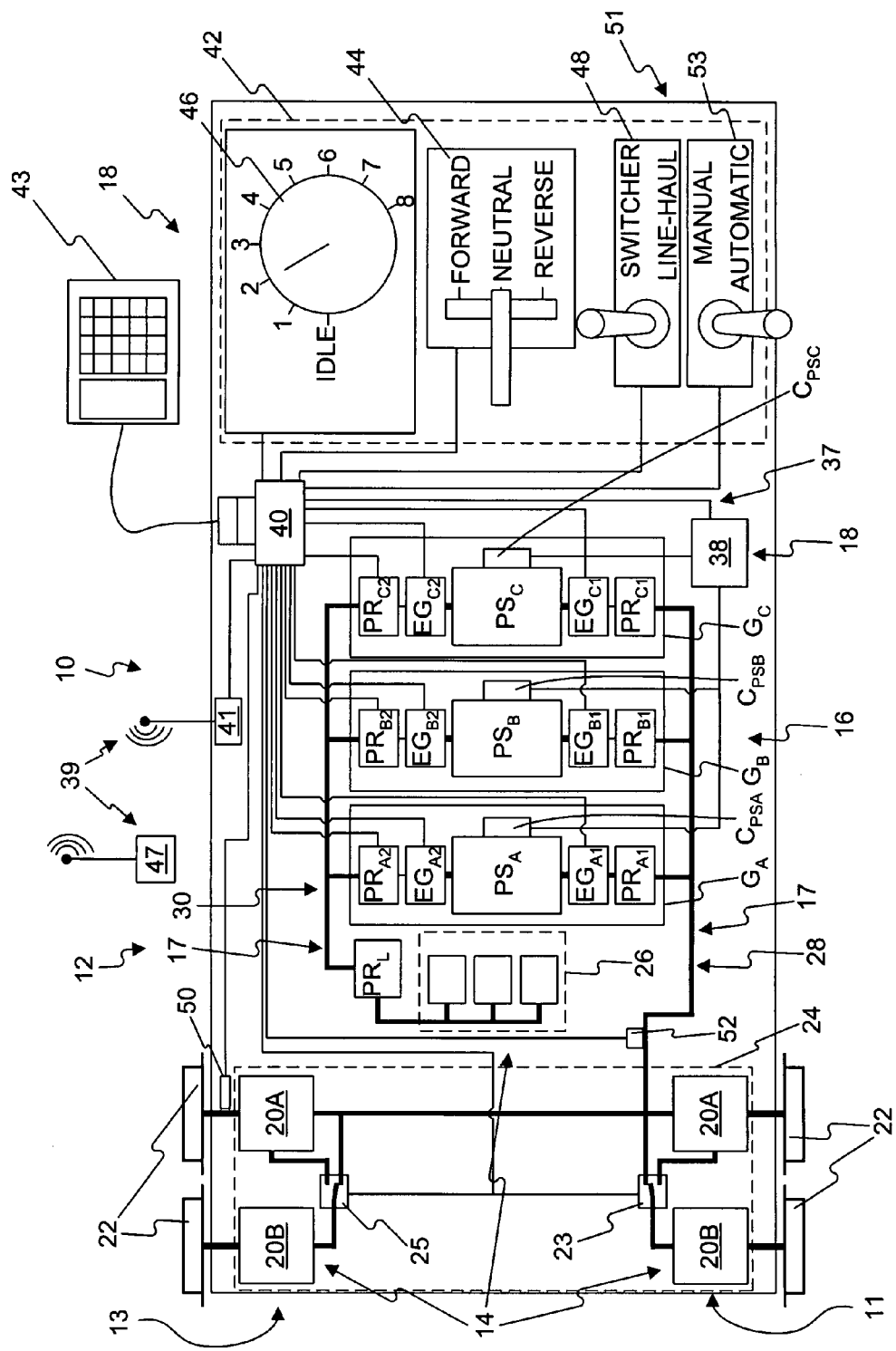
FIG. 1 is a schematic illustration of one embodiment of a machine that includes a power system according to the present disclosure.

FIG. 1 illustrates a machine 10 having a power system 12 according to the present disclosure. Power system 12 may include one or more electric power loads 14, a plurality of electric power sources 16, a power-transfer system 17 for transferring electricity from electric power sources 16 to electric power loads 14, and power-system controls 18. Electric power loads 14 may include a first set of one or more electric power loads 24 and a second set of one or more electric power loads 26.

Depending on the role that machine 10 serves, the one or more electric power loads 14 of power system 12 may include various types of components. In some embodiments, machine 10 may be a mobile machine, and the first set of electric power loads 24 may include a group 11 of electric propulsion motors 20A, 20B and a group 13 of electric propulsion motors 20A, 20B. Each of electric propulsion motors 20A, 20B may be drivingly connected to one or more propulsion devices 22 for propelling machine 10. In some embodiments, machine 10 may be a railroad locomotive. Electric propulsion motors 20A, 20B may include any type of electric motors. In some embodiments, electric propulsion motors 20A, 20B may be DC motors. Propulsion devices 22 may include any types of components operable to propel machine 10 by receiving mechanical power from electric propulsion motors 20A, 20B and applying at least a portion of that power to the environment around machine 10. For example, as FIG. 1 shows, propulsion devices 22 may be wheels. In embodiments where machine 10 is a railroad locomotive, propulsion devices 22 may be wheels configured to ride on and apply power to rails.

The second set of electric power loads 26 may include any types of components that use electricity. For example, the second set of electric power loads 26 may include lights, heating and/or cooling devices, air compressors, pumps, actuators for moving various components of machine 10, and/or various other types of electric components.

Electric power sources 16 may include a plurality of generator units $G_A$, $G_B$, $G_C$. Each generator unit $G_A$, $G_B$, $G_C$ may include any component or components operable to supply electricity. In some embodiments, each generator unit $G_A$, $G_B$, $G_C$ may include a power source $PS_A$, $PS_B$, $PS_C$ and at least one electric generator drivingly connected to the power source $PS_A$, $PS_B$, $PS_C$. Each power source $PS_A$, $PS_B$, $PS_C$ may be any type of component operable to produce mechanical power, including, but not limited to, a diesel engine, a turbine engine, a gasoline engine, or a gaseous-fuel-driven engine. In some embodiments, each generator unit $G_A$, $G_B$, $G_C$ may have drivingly connected to its power source $PS_A$, $PS_B$, $PS_C$ an electric generator $EG_{A1}$, $EG_{B1}$, $EG_{C1}$ for supplying electricity to the first set of electric power loads 24. Additionally, each generator unit $G_A$, $G_B$, $G_C$ may have drivingly connected to its power source $PS_A$, $PS_B$, $PS_C$ another electric generator $EG_{A2}$, $EG_{B2}$, $EG_{C2}$ for supplying electricity to the second set of electric power loads 26.

Each electric generator $EG_{A1}$, $EG_{B1}$, $EG_{C1}$, $EG_{A2}$, $EG_{B2}$, $EG_{C2}$ may be any type of component configured to receive mechanical power from the associated power source $PS_A$, $PS_B$, $PS_C$ and convert at least a portion of that mechanical power into electricity. For example, electric generators $EG_{A1}$, $EG_{B1}$, $EG_{C1}$, $EG_{A2}$, $EG_{B2}$, $EG_{C2}$ may include one or more AC induction generators, one or more permanent-magnet generators, one or more AC synchronous generators, and/or one or more switched-reluctance generators. In some embodiments, one or more of electric generators $EG_{A1}$, $EG_{B1}$, $EG_{C1}$, $EG_{A2}$, $EG_{B2}$, $EG_{C2}$ may be different kinds of electric generators. For example, electric generator $EG_{A1}$ may be one type of electric generator, and electric generator $EG_{A2}$ may be another type of electric generator.

Each generator unit $G_A$, $G_B$, $G_C$ may also include one or more control components. For example, each electric generator $EG_{A1}$, $EG_{B1}$, $EG_{C1}$, $EG_{A2}$, $EG_{B2}$, $EG_{C2}$ may include a power electronics module. The power electronics module of each electric generator $EG_{A1}$, $EG_{B1}$, $EG_{C1}$, $EG_{A2}$, $EG_{B2}$, $EG_{C2}$ may control excitation current of the electric generator $EG_{A1}$, $EG_{B1}$, $EG_{C1}$, $EG_{A2}$, $EG_{B2}$, $EG_{C2}$, thereby controlling one or more aspects of the electricity generated by the electric generator $EG_{A1}$, $EG_{B1}$, $EG_{C1}$, $EG_{A2}$, $EG_{B2}$, $EG_{C2}$.

Additionally, to regulate the flow of electricity from electric generators $EG_{A1}$, $EG_{B1}$, $EG_{C1}$, $EG_{A2}$, $EG_{B2}$, $EG_{C2}$ to power-transfer system 17, each generator unit $G_A$, $G_B$, $G_C$ may include a power regulator $PR_{A1}$, $PR_{B1}$, $PR_{C1}$ for its electric generator $EG_{A1}$, $EG_{B1}$, $EG_{C1}$ and a power regulator $PR_{A2}$, $PR_{B2}$, $PR_{C2}$ for its electric generator $EG_{A2}$, $EG_{B2}$, $EG_{C2}$. Each power regulator $PR_{A1}$, $PR_{B1}$, $PR_{C1}$, $PR_{A2}$, $PR_{B2}$, $PR_{C2}$ may be any type of device configured to regulate one or more aspects of the transfer of electricity from the associated electric generator $EG_{A1}$, $EG_{B1}$, $EG_{C1}$, $EG_{A2}$, $EG_{B2}$, $EG_{C2}$ to power-transfer system 17. Each power regulator $PR_{A1}$, $PR_{B1}$, $PR_{C1}$, $PR_{A2}$, $PR_{B2}$, $PR_{C2}$ may, for example, include a rectifier for converting multiphase AC electricity generated by the associated electric generator $EG_{A1}$, $EG_{B1}$, $EG_{C1}$, $EG_{A2}$, $EG_{B2}$, $EG_{C2}$ into DC electricity. In some such embodiments, the rectifier of each power regulator $PR_{A1}$, $PR_{B1}$, $PR_{C1}$, $PR_{A2}$, $PR_{B2}$, $PR_{C2}$ may include diodes that allow electricity to flow from the associated electric generator $EG_{A1}$, $EG_{B1}$, $EG_{C1}$, $EG_{A2}$, $EG_{B2}$, $EG_{C2}$ to power-transfer system 17, but not in the opposite direction. Power regulators $PR_{A2}$, $PR_{B2}$, $PR_{C2}$ may also be operable to control the voltage of the electricity supplied to power-transfer system 17 by electric generators $EG_{A2}$, $EG_{B2}$, $EG_{C2}$.

Each generator unit $G_A$, $G_B$, $G_C$ may also include a power-source controller $C_{PSA}$, $C_{PSB}$, $C_{PSC}$. Power-source controllers $C_{PSA}$, $C_{PSB}$, $C_{PSC}$ may each include one or more processors (not shown) and one or more memory devices (not shown). Each power-source controller $C_{PSA}$, $C_{PSB}$, $C_{PSC}$ may control whether the generator unit $G_A$, $G_B$, $G_C$ it belongs to runs by controlling whether the associated power source $PS_A$, $PS_B$, $PS_C$ runs. Each power-source controller $C_{PSA}$, $C_{PSB}$, $C_{PSC}$ may also control various other aspects of the operation of the associated power source $PS_A$, $PS_B$, $PS_C$, including, but not limited to, its operating speed and power output. Accordingly, each power-source controller $C_{PSA}$, $C_{PSB}$, $C_{PSC}$ may monitor various operating parameters of the associated power source $PS_A$, $PS_B$, $PS_C$, such as its operating speed, its operating temperature, its power output, how much fuel it is consuming or has consumed, one or more aspects of the operation of its lubrication system, and/or various similar parameters. Power-source controllers $C_{PSA}$, $C_{PSB}$, $C_{PSC}$ may use sensors and/or any other suitable means to monitor such operating parameters.

Power-transfer system 17 may include any component or components operable to transfer power from electric power sources 16 to the one or more electric power loads 14. For example, power-transfer system 17 may include a circuit 28 for transferring power from electric generators $EG_{A1}$, $EG_{B1}$, $EG_{C1}$ to the first set of electric power loads 24 and a circuit 30 for transferring power from electric generators $EG_{A2}$, $EG_{B2}$, $EG_{C2}$ to the second set of electric power loads 26. Circuits 28, 30 may be electrically isolated from one another. Power-transfer system 17 may include various provisions for regulating and/or modifying electricity supplied to electric power loads 14. For example, circuit 30 may include a power regulator $PR_L$ operable to convert DC electricity received from power regulators $PR_{A2}$, $PR_{B2}$, $PR_{C2}$ into AC electricity for use by the second set of electric power loads 26.

Additionally, power-transfer system 17 may include one or more components operable to change the manner in which electric propulsion motors 20A, 20B are electrically connected to circuit 28. For example, power-transfer system 17 may include switching devices 23, 25. Each switching device 23, 25 may have one operating state that connects the electric propulsion motors 20A, 20B of the associated group 11, 13 to circuit 28 in series and another operating state that connects the associated electric propulsion motors 20A, 20B to circuit 28 in parallel.

Power-system controls 18 may include any components configured to control operation of machine 10 in the manners discussed hereinbelow. Power-system controls 18 may include various components of generator units $G_A$, $G_B$, $G_C$, power-transfer system 17, and electric power loads 14. For example, in the embodiment shown in FIG. 1, power-system controls 18 may include the power electronics modules (not shown) of electric generators $EG_{A1}$, $EG_{B1}$, $EG_{C1}$, $EG_{A2}$, $EG_{B2}$, $EG_{C2}$; power regulators $PR_{A1}$, $PR_{B1}$, $PR_{C1}$, $PR_{A2}$, $PR_{B2}$, $PR_{C2}$, $PR_L$; and power-source controllers $C_{PSA}$, $C_{PSB}$, $C_{PSC}$. Additionally, as FIG. 1 shows, power-system controls 18 may include a controller 38, a controller 40, an operator interface 42, and a service interface 43. Power-system controllers $C_{PSA}$, $C_{PSB}$, $C_{PSC}$, controller 38, controller 40, and operator interface 42 may form a control network 37.

Each controller 38, 40 may include one or more processors (not shown) and one or more memory devices (not shown). Controller 38 may be operatively connected to each power-source controller $C_{PSA}$, $C_{PSB}$, $C_{PSC}$. This may allow controller 38 to receive information about the operation of power sources $PS_A$, $PS_B$, $PS_C$ from power-source controllers $C_{PSA}$, $C_{PSB}$, $C_{PSC}$ and/or indirectly control one or more aspects of the operation of power sources $PS_A$, $PS_B$, $PS_C$ by transmitting control signals to power-source controllers $C_{PSA}$, $C_{PSB}$, $C_{PSC}$. Controller 38 may also be operatively connected to controller 40, so that controllers 38, 40 may exchange information. Controller 40 may also be operatively connected to the power electronics module of each electric generator $EG_{A1}$, $EG_{B1}$, $EG_{C1}$, $EG_{A2}$, $EG_{B2}$, $EG_{C2}$, so that controller 40 may control generation of electricity by electric generators $EG_{A1}$, $EG_{B1}$, $EG_{C1}$, $EG_{A2}$, $EG_{B2}$, $EG_{C2}$. Similarly, controller 40 may be operatively connected to each power regulator $PR_{A2}$, $PR_{B2}$, $PR_{C2}$, so that controller 40 may control one or more aspects of the electricity supplied to power-transfer system 17 by electric generators $EG_{A2}$, $EG_{B2}$, $EG_{C2}$, such as the voltage of the electricity. Additionally, controller 40 may be operatively connected to switching devices 23, 25, so that controller 40 may control whether electric propulsion motors 20A, 20B are connected to circuit 28 in series or parallel.

To facilitate effective control of the supply of electricity to electric power loads 14, controller 40 may monitor various aspects of the generation of electricity by electric generators $EG_{A1}$, $EG_{B1}$, $EG_{C1}$, $EG_{A2}$, $EG_{B2}$, $EG_{C2}$ and/or various aspects of the transmission of electricity through power-transfer system 17. For example, controller 40 may monitor the voltage, current, frequency, and/or phase of electricity generated by one or more of electric generators $EG_{A1}$, $EG_{B1}$, $EG_{C1}$, $EG_{A2}$, $EG_{B2}$, $EG_{C2}$. Controller 40 may employ sensors and/or other suitable means to monitor such operating parameters. In some embodiments, controller 40 may monitor the voltage in circuit 28 with a voltage sensor 52. Controller 40 may also monitor various other aspects of the operation of machine 10 through various means. For example, controller 40 may monitor the speed of mobile machine 10 with a speed sensor 50.

Operator interface 42 may include any component or components configured to transmit operator inputs to one or more components of machine 10. In some embodiments, operator interface 42 may include components that an operator can manipulate to indicate whether the operator desires propulsion of machine 10 by electric propulsion motors 20A, 20B and, if so, in what direction and with how much power the operator desires electric propulsion motors 20A, 20B to propel machine 10. For example, as FIG. 1 shows, operator interface 42 may include a reverser 44 and a power selector 46.

Reverser 44 may have an operating state designated "FORWARD," which an operator can select to indicate that the operator desires forward propulsion; an operating state designated "REVERSE," which an operator can select to indicate that the operator desires backward propulsion; and an operating state designated "NEUTRAL," which an operator can select to indicate that the operator does not desire propulsion of machine 10. Reverser 44 may indicate to one or more other components of power-system controls 18 which of the FORWARD, REVERSE, and NEUTRAL operating states the operator has selected. For example, reverser 44 may transmit a signal to controller 40 indicating which of these three operating states the operator has selected.

Power selector 46 may serve as a means by which the operator can indicate how much power the operator desires electric propulsion motors 20A, 20B to employ to propel machine 10. Power selector 46 may have a plurality of discrete power settings that an operator can select to indicate one of a plurality of discrete power levels that the operator desires for propulsion of machine 10. For example, as FIG. 1 shows, power selector 46 may have an "IDLE" power setting and power settings 1-8. The IDLE power setting may correspond to the lowest desired power level for propulsion, and progressively higher numerical power settings may correspond to progressively higher desired power levels for propulsion. In some embodiments, rather than a plurality of discrete power settings, power selector 46 may have a continuous range of power settings that an operator may select. Power selector 46 may communicate which power setting the operator has selected to one or more other components of power-system controls 18. For example, power selector 46 may transmit a signal to controller 40 indicating the power setting selected by the operator.

Operator interface 42 may also include one or more mode-selection components 51 related to control of which of a plurality of available propulsion modes machine 10 operates in. In some embodiments where machine 10 is a locomotive, the propulsion modes available may include a "line-haul" mode of operation and a "switcher" mode of operation. The line-haul mode of operation may be a mode of operation tailored for pulling railroad cars long distances. The switcher mode of operation may be a mode of operation tailored for moving railroad cars in a railyard.

Mode-selection components 51 may include an automatic/manual mode selector 53 and a manual propulsion-mode selector 48. Automatic/manual mode selector 53 may have an "AUTOMATIC" operating state that an operator can select to request that power-system controls 18 automatically select the propulsion mode. Additionally, automatic/manual mode selector 53 may have a "MANUAL" operating state that an operator can select to request manual control of the propulsion mode. Manual propulsion-mode selector 48 may allow the operator to manually select the propulsion mode for machine 10 when automatic/manual mode selector 53 is in the MANUAL operating state. For example, manual propulsion-mode selector 48 may have a "LINE-HAUL" operating state for indicating that the operator desires the "line-haul" mode of operation and a "SWITCHER" operating state for indicating that the operator desires the "switcher" mode of operation. Automatic/manual mode selector 53 and manual propulsion-mode selector 48 may communicate the operator's selections to one or more other components of power-system controls 18. For example, automatic/manual mode selector 53 may send a signal to controller 40 indicating whether the operator has selected automatic or manual control of the propulsion mode. Similarly, manual propulsion-mode selector 48 may send a signal to controller 40 indicating whether manual propulsion-mode selector 48 is in its LINE-HAUL operating state or its SWITCHER operating state.

As shown in FIG. 1, service interface 43 may be an off-board service tool that is not permanently mounted to machine 10 but configured to be readily communicatively linked to control network 37 to allow a technician to transmit communications to and receive communications from control network 37. Such a service tool may include one or more processors (not shown) and or memory devices (not shown). Service interface 43 may be configured with provisions for enabling the operator of machine 10 to command power-system controls 18 to exclude one or more of generator units $G_A$, $G_B$, $G_C$ from operation. Accordingly, control network 37 may be configured to receive from service interface 43 a predetermined communication for indicating that the operator wishes one or more of generator units $G_A$, $G_B$, $G_C$ excluded from operation and to thereafter store data indicating that those one or more generator units $G_A$, $G_B$, $G_C$ should be excluded from operation. Service interface 43 is not limited to the configuration shown in FIG. 1. For example, in addition to, or in place of, an off-board service tool, service interface 43 may include one or more components mounted to machine 10 and communicatively linked to control network 37. In some embodiments, service interface 43 may include components of control network 37.

There may also be a position-information system 39 capable of providing information about the location of machine 10. Position-information system 39 may include any component or components operable to provide information about the location of machine 10. In some embodiments, position-information system 39 may include one or more components on machine 10 that interact with one or more components off board machine 10 to provide information about the location of machine 10. For example, position-information system 39 may constitute a so-called "Global Positioning System" with an information processor 41 on-board machine 10 and an off-board portion 47 that interact with one another to generate information about the location of machine 10. In some embodiments, position-information system 39 may be communicatively linked to power-system controls 18, so that position-information system 39 may communicate information about the location of machine 10 to power-system controls 18. For example, as FIG. 1 shows, information processor 41 may be communicatively linked to controller 40. Position-information system 39 may communicate with power-system controls 18 via hardwired communication lines, or position-information system 39 may communicate with power-system controls 18 without hardwired communication lines, such as via electromagnetic waves.

Alternatively, in some embodiments, position-information system 39 may not be directly communicatively linked to power-system controls 18. In some such embodiments, power-system controls 18 may have provisions for allowing the operator to communicate to power-system controls 18 information received from position-information system 39 about the location of machine 10. For example, operator interface 42 may include components that the operator may use to feed information about the location of machine 10 to power-system controls 18.

Additionally, in some embodiments, power-system controls 18 may incorporate one or more components of position-information system 39. In some such embodiments, power-system controls 18 may interact directly with the off-board portion 47 of position-information system 39 to generate information about the location of machine 10.

Furthermore, position-information system 39 may be composed exclusively of components on-board machine 10 or exclusively of components off board of machine 10. In embodiments where position-information system 39 is composed exclusively of components disposed on machine 10, position information-system 39 may, for example, use various sensors to keep track of how far and/or in what direction machine 10 has traveled. In embodiments where position-information system 39 is composed exclusively of components off board of machine 10, position-information system 39 may, for example, include various components for detecting the position of machine 10.

Power system 12 is not limited to the configuration shown in FIG. 1. For example, electric power sources 16 may omit one or more of generator units $G_A$, $G_B$, $G_C$ or include other generator units in addition to generator units $G_A$, $G_B$, $G_C$. Additionally, one or more of generator units $G_A$, $G_B$, $G_C$ may have fewer or more than two electric generators drivingly connected to their power source $PS_A$, $PS_B$, $PS_C$. Furthermore, electric power loads 14 may include different numbers and/or types of components than shown in FIG. 1. For example, electric power loads 14 may include more or fewer electric propulsion motors than shown in FIG. 1. In some embodiments, power system 12 may omit electric propulsion motors 20A, 20B altogether. In some such embodiments, power system 12 may not be part of a mobile machine. Moreover, power-transfer system 17 may have a different configuration than shown in FIG. 1. In some embodiments, power-transfer system 17 may not electrically isolate electric propulsion motors 20A, 20B from the other electric power loads 14 of machine 10.

Power-system controls 18 may also have a different configuration than shown in FIG. 1. For example, power-system controls 18 may have a different combination of controllers than shown in FIG. 1 for controlling generation and supply of electricity. Similarly, in addition to, or in place of, one or more of power-source controllers $C_{PSA}$, $C_{PSB}$, $C_{PSC}$, controller 38, and controller 40, power-system controls 18 may include other types of control components, such as hardwired control circuits. Additionally, operator interface 42 may have a different configuration than the example provided in FIG. 1. Operator interface 42 may, for example, have different types of components that an operator can employ to indicate how the operator desires power system 12 to propel machine 10. For example, in some embodiments, power-system controls 18 may not allow manual control of the propulsion mode of machine 10, in which case, operator interface 42 may omit mode-selection components 51. In embodiments where machine 10 is not a mobile machine, operator interface 42 may omit all components related to propulsion control.

INDUSTRIAL APPLICABILITY

Power system 12 may have application for any task requiring power. For example, in embodiments where machine 10 is a mobile machine and power system 12 includes electric propulsion motors 20A, 20B, power system 12 may have application for propelling machine 10 to accomplish various tasks. Where machine 10 is a railroad locomotive, power system 12 may serve the purpose of propelling machine 10 to move railroad cars. To propel machine 10, power system 12 may run one or more of generator units $G_A$, $G_B$, $G_C$ and supply electricity from one or more of electric generators $EG_{A1}$, $EG_{B1}$, $EG_{C1}$ of the one or more running generator units $G_A$, $G_B$, $G_C$ to electric propulsion motors 20A, 20B via power-transfer system 17.

In addition to propelling machine 10 with electric propulsion motors 20A, 20B, power system 12 may serve various other purposes with the second set of electric power loads 26. For example, with the second set of electric power loads 26, power system 12 may provide light, heating, cooling, compressed air, pump fluids, and/or move various components of machine 10. To accomplish such tasks, power-system controls 18 may run one or more of generator units $G_A$, $G_B$, $G_C$ and supply electricity from one or more of electric generators $EG_{A2}$, $EG_{B2}$, $EG_{C2}$ of the one or more running generator units $G_A$, $G_B$, $G_C$ to the second set of electric power loads 26.

In some embodiments and/or circumstances, the first set of electric power loads 24 may require electricity with one or more different characteristics from the electricity required by the second set of electric power loads 26. Meeting such a need may prove relatively straightforward with each generator unit $G_A$, $G_B$, $G_C$ having one electric generator $EG_{A1}$, $EG_{B1}$, $EG_C$, associated with the first set of electric power loads 24 and a separate electric generator $EG_{A2}$, $EG_{B2}$, $EG_{C2}$ associated with the second set of electric power loads 26. With this configuration, power system 12 may readily use electric generators $EG_{A1}$, $EG_{B1}$, $EG_{C1}$ to supply to the first set of electric power loads 24 electricity that has one or more characteristics different from the electricity supplied to the second set of electric power loads 26 with electric generators $EG_{A2}$, $EG_{B2}$, $EG_{C2}$.

For purposes of this disclosure, the electricity supplied to the first set of electric power loads 24 and the electricity supplied to the second set of electric power loads 26 have one or more different characteristics if they have different voltages and/or one or more different time-based characteristics. Time-based characteristics include whether the electricity is DC or AC and, if it is AC, the phase and frequency of the electricity. In some embodiments, power-system controls 18 may regulate the voltage of the electricity supplied to the second set of electric power loads 26 with power regulators $PR_{A2}$, $PR_{B2}$, $PR_{C2}$ while allowing the voltage of electricity supplied to the first set of electric power loads 24 to vary dependent on the speed of electric propulsion motors 20A, 20B.

In order to control generator units $G_A$, $G_B$, $G_C$ to meet the needs of electric power loads 14, power-system controls 18 may monitor one or more electricity requirements of electric power loads 14 during operation of power system 12. For purposes of this disclosure, the term "electricity requirement" may refer to either a quantity of electric power required or a quantity of electric current required. The term "quantity of electric power" refers to the product of a quantity of electric current and the voltage at which the electric current is supplied, whereas the term "quantity of electric current" refers to the magnitude of the electric current without regard to the voltage at which it is supplied. Controller 40 may, for example, determine the aggregate quantity of electric power required by the second set of electric power loads 26 and the aggregate quantity of electric current required by the second set of electric power loads 26. Controller 40 may do so with information about electricity flowing in one or more portions of circuit 30 and/or with information about the operating states of one or more of the members of the second set of electric power loads 26.

Power-system controls 18 may determine one or more electricity requirements of the first set of electric power loads 24 based at least in part on operator inputs related to the desired propulsion of machine 10 with electric propulsion motors 20A, 20B. For example, controller 40 may determine the quantity of power required by electric propulsion motors 20A, 20B based on the signal received from reverser 44 and the signal received from power selector 46. If the signal from reverser 44 indicates that the operator has selected the NEUTRAL operating state, controller 40 may determine that electric propulsion motors 20A, 20B do not require power. If the signal from reverser 44 indicates that the operator has selected either the FORWARD or REVERSE operating states, controller 40 may determine the quantity of electric power required by electric propulsion motors 20A, 20B based on which power setting of power selector 46 the operator has selected. For example, controller 40 may use a lookup table that indicates the quantity of electric power required by electric propulsion motors 20A, 20B for each respective power setting. For each successively higher power setting, electric propulsion motors 20A, 20B may require a higher quantity of electric power.

Power-system controls 18 may also determine the aggregate quantity of electric current required by electric propulsion motors 20A, 20B. Controller 40 may compute the aggregate quantity of electric current required for electric propulsion motors 20A, 20B by dividing the aggregate quantity of electric power that the electric propulsion motors 20A, 20B require by the voltage of the electricity supplied to electric propulsion motors 20A, 20B. In embodiments where power-system controls 18 allow the voltage of the electricity supplied to electric propulsion motors 20A, 20B to vary dependent on the speed of electric propulsion motors 20A, 20B, controller 40 may employ various means to determine the voltage of electricity supplied to electric propulsion motors 20A, 20B. Controller 40 may determine the voltage directly with voltage sensor 52. Alternatively, controller 40 may determine the voltage using the speed of machine 10, as sensed by speed sensor 50, and a known relationship between the speed of machine 10 and the voltage of electricity supplied to electric propulsion motors 20A, 20B.

Figure 2A:
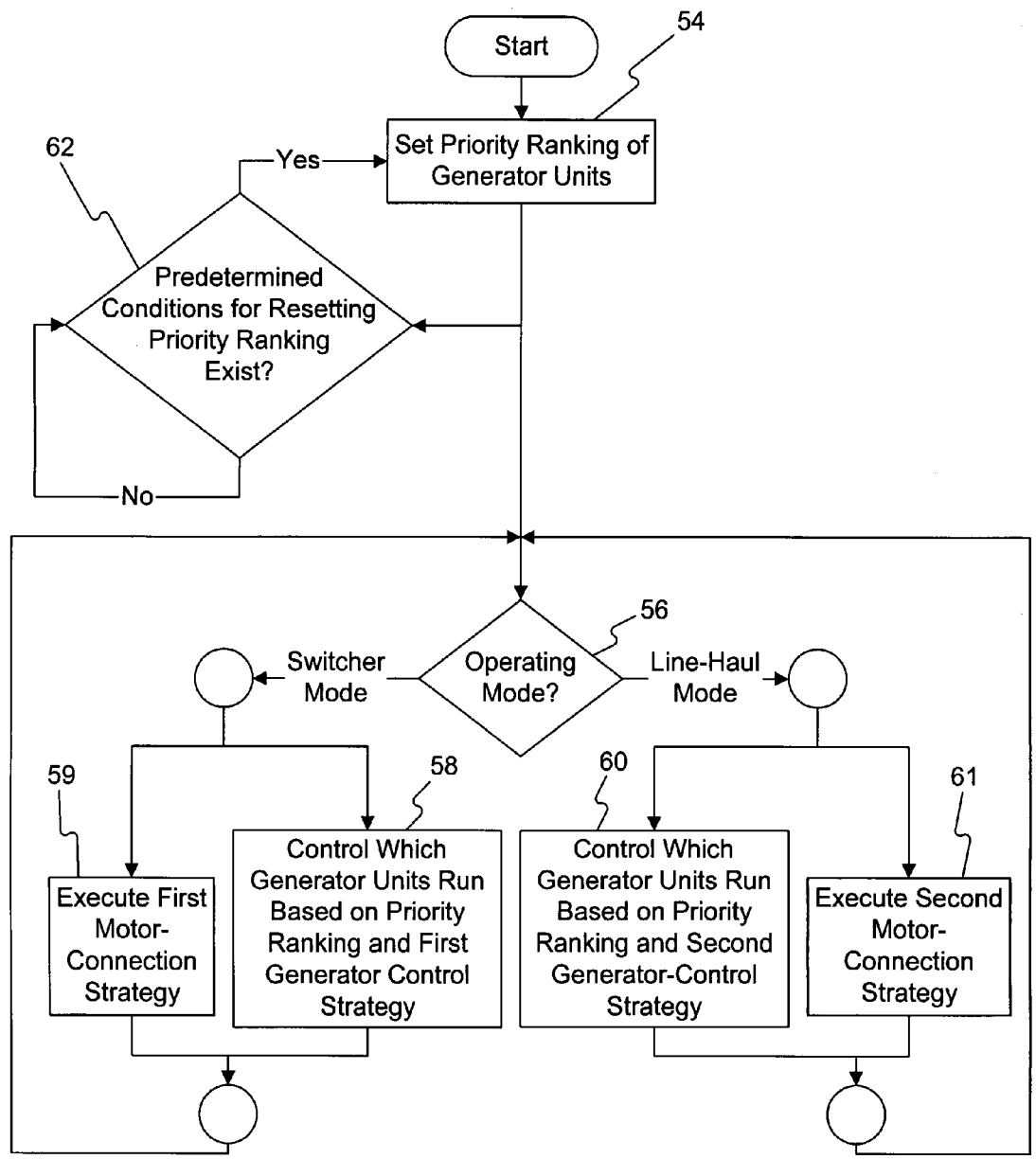
FIG. 2A is a flow chart illustrating one embodiment of a control method according to the present disclosure.

Based on the determined electricity requirements of electric power loads 14, power-system controls 18 may automatically control which of generator units $G_A$, $G_B$, $G_C$ run. Power-system controls 18 may also automatically control how electric propulsion motors 20A, 20B are connected to circuit 28. FIGS. 2A-2J illustrate one embodiment of a control method that power-system controls 18 may execute to automatically control these aspects of the operation of machine 10. This control method may ensure that generator units $G_A$, $G_B$, $G_C$ meet the electricity requirements of machine 10 while balancing usage of generator units $G_A$, $G_B$, $G_C$. FIG. 2A gives an overview of the high-level processes of the control method, and each of FIGS. 2C-2J provides details of one of the high-level processes shown in FIG. 2A.

As shown in FIG. 2A, initially, power-system controls 18 may set a priority ranking for generator units $G_A$, $G_B$, $G_C$ (step 54). This may involve designating one of generator units $G_A$, $G_B$, $G_C$ as a first priority generator unit, designating another of the generator units $G_A$, $G_B$, $G_C$ as a second priority generator unit, and designating the remaining generator unit $G_A$, $G_B$, $G_C$ as a third priority generator unit. As discussed below, in some circumstances, power-system controls 18 may exclude one or more of generator units $G_A$, $G_B$, $G_C$ from the priority ranking for various reasons.

Figure 2B:
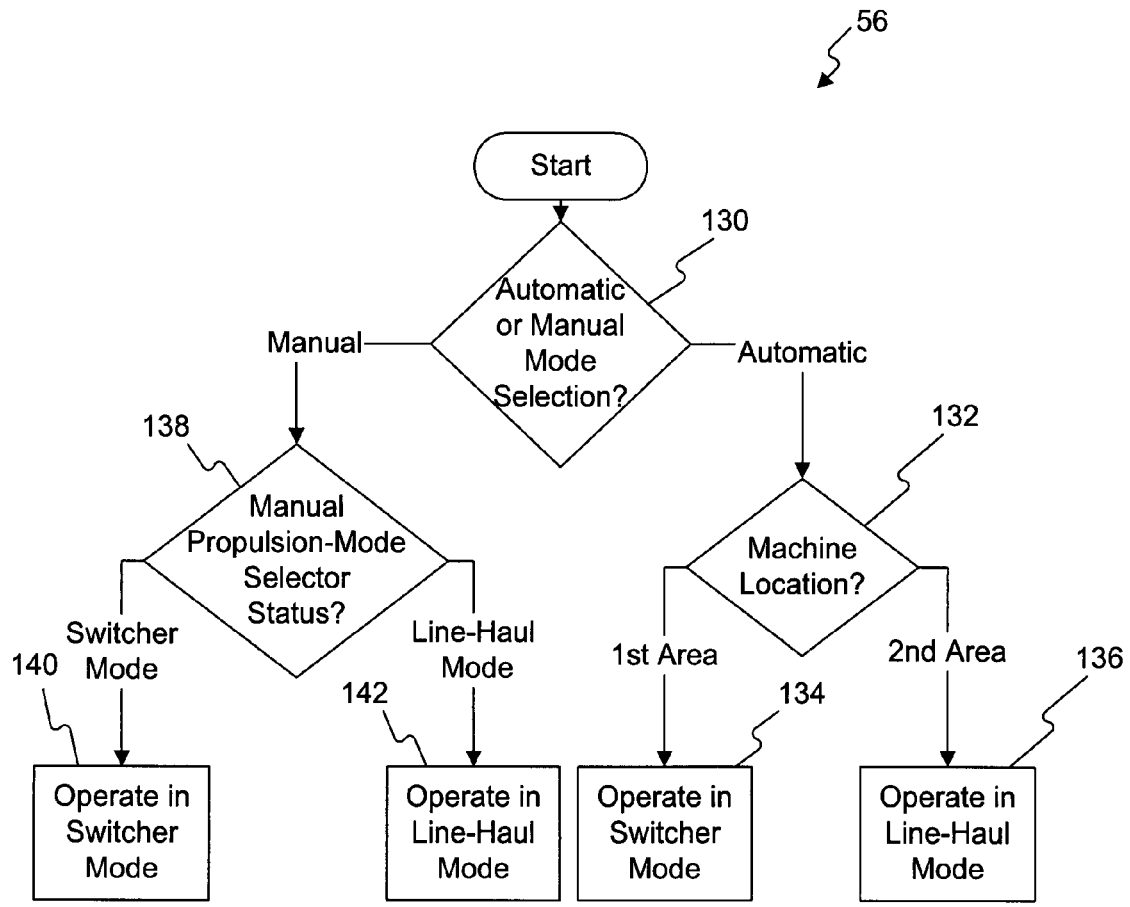
FIG. 2B is a flow chart illustrating one of the processes of the flow chart of FIG. 2A in greater detail.

After setting the priority ranking, power-system controls 18 may determine whether to operate in switcher mode or line-haul mode (step 56). Power-system controls 18 may base this determination on various criteria. FIG. 2B shows one embodiment of a method that power-system controls 18 may use to determine whether to operate in switcher mode or line-haul mode. In this embodiment, power-system controls 18 may first determine whether the operator has requested manual control or automatic control with automatic/manual mode selector 53 (step 130).

If the operator has requested automatic control, power-system controls 18 may then determine whether machine 10 is disposed within a first area or a second area (step 132). The first area and the second area may be defined in various manners. In some embodiments, the first area may be an area that is associated with and includes at least a portion of a railyard, and the second area may be an area disposed outside of the first area and at least partially outside of the railyard. In some such embodiments, the boundaries of the first area and the second area may coincide along their entire length with a boundary of the railyard. Alternatively, some or all of the boundary of the first area and/or some or all of the boundary of the second area may lie inside or outside the boundary of the railyard. Additionally, the boundaries of the first area and the second area may have a fixed definition, or they may be subject to change by various entities. To determine whether machine 10 is located in the first area or the second area, power-system controls 18 may use information from position-information system 39.

In automatic mode, if machine 10 is in the first area, such as inside a railyard, power-system controls 18 may automatically operate in switcher mode (step 134). Conversely, if machine 10 is in the second area, such as outside of a railyard, power-system controls 18 may automatically operate in line-haul mode (step 136).

If the operator has requested manual control, power-system controls 18 may determine the status of manual propulsion-mode selector 48 (step 138). If the operator has selected the SWITCHER operating state of manual propulsion-mode selector 48, power-system controls 18 may operate in switcher mode (step 140). On the other hand, if the operator has selected the LINE-HAUL state of manual propulsion-mode selector 48, power-system controls 18 may operate in line-haul mode (step 142).

Methods that power-system controls 18 may use to determine whether to operate in switcher mode or line-haul mode are not limited to the examples discussed above in connection with FIG. 2B. For example, in some embodiments, power-system controls 18 may always automatically determine whether to operate in switcher mode or line-haul mode, giving the operator no option to override the operating mode automatically selected by power-system controls 18. In such embodiments, as in the embodiment shown in FIG. 2B, power-system controls 18 may automatically determine whether to operate in switcher mode or line-haul mode based on the location of machine 10, such as based on whether machine 10 is inside or outside of an area associated with a railyard. Additionally, in combination with, or in place of, operator inputs and the location of machine 10, power-system controls 18 may use one or more other parameters as factors in determining whether to operate in switcher mode or line-haul mode.

Returning to FIG. 2A, if power-system controls 18 select the switcher mode of operation, power-system controls 18 may control which of generator units $G_A$, $G_B$, $G_C$ run based on their priority ranking and a first generator-control strategy (step 58). On the other hand, if power-system controls 18 select the line-haul mode of operation, power-system controls 18 may control which of generator units $G_A$, $G_B$, $G_C$ run based on their priority ranking and a second generator-control strategy (step 60).

Both the first generator-control strategy (step 58) and the second generator-control strategy (step 60) may involve running a generator unit $G_A$, $G_B$, $G_C$ with a higher position in the priority ranking in preference to a generator unit $G_A$, $G_B$, $G_C$ with a lower position in the priority ranking. For example, in circumstances that warrant running only one generator unit $G_A$, $G_B$, $G_C$, power-system controls 18 may run the first priority generator unit $G_A$, $G_B$, $G_C$ in preference to the second and third priority generator units $G_A$, $G_B$, $G_C$. Similarly, in circumstances that warrant running two of generator units $G_A$, $G_B$, $G_C$, power-system controls 18 may run the first priority generator unit $G_A$, $G_B$, $G_C$ and the second priority generator unit $G_A$, $G_B$, $G_C$ in preference to the third priority generator unit $G_A$, $G_B$, $G_C$.

While controlling which of generator units $G_A$, $G_B$, $G_C$ run based on either the first generator-control strategy or the second generator-control strategy, power-system controls 18 may repeatedly determine whether predetermined conditions that serve as a trigger for resetting the priority ranking exist (step 62). Power-system controls 18 may reset the priority ranking each time these predetermined conditions arise. Predetermined conditions that power-system controls 18 may use as a trigger for resetting the priority ranking are discussed in more detail below in connection with FIG. 2I.

Figure 2C:
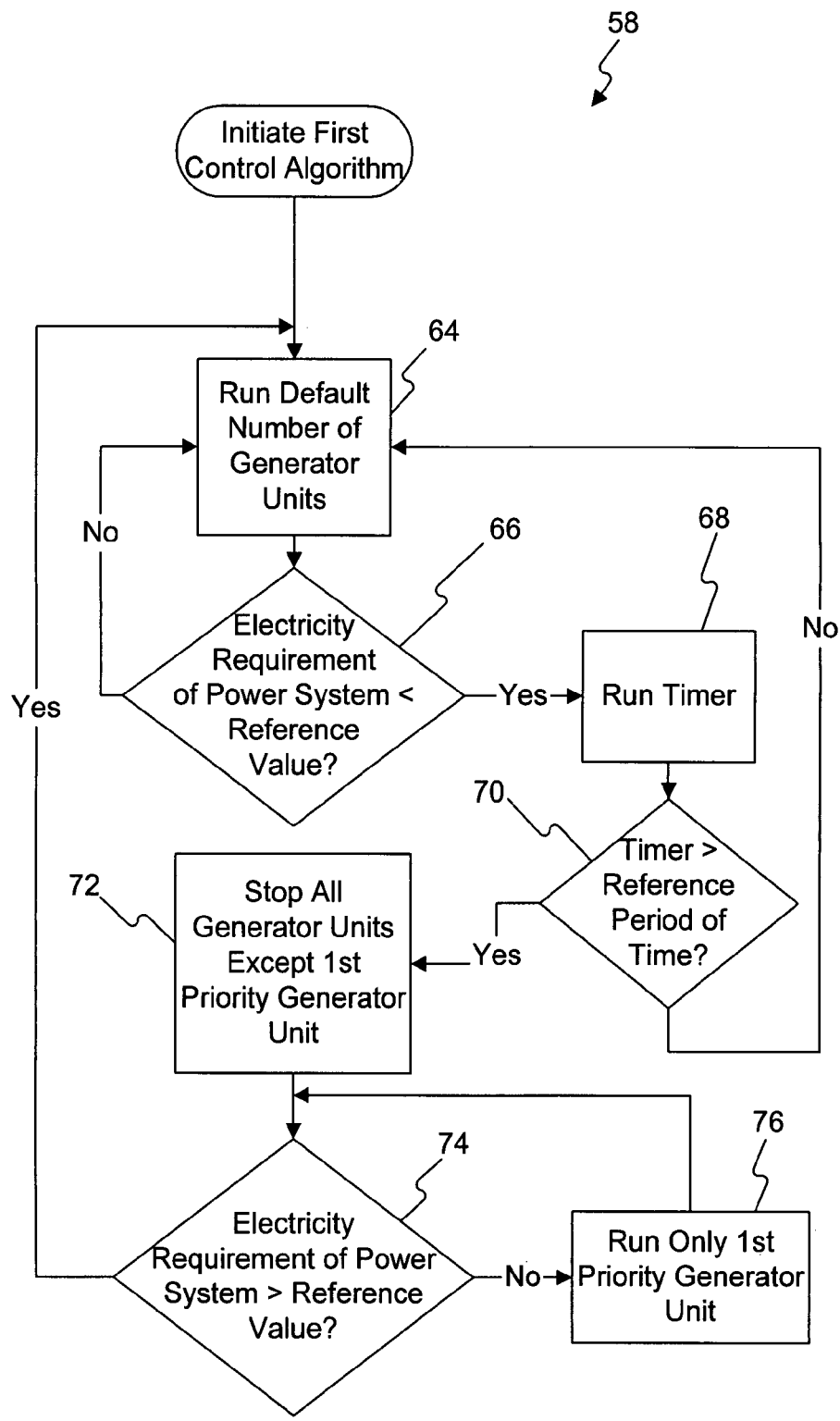
FIG. 2C is a flow chart illustrating another of the processes of the flow chart of FIG. 2A in greater detail.

FIG. 2C illustrates one embodiment of the first generator-control strategy (step 58, FIG. 2A). Upon entering switcher mode and initiating control according to the first generator-control strategy, power-system controls 18 may run a default number of generator units $G_A$, $G_B$, $G_C$ (step 64), regardless of the electricity requirements of power system 12. The default number of generator units $G_A$, $G_B$, $G_C$ that power-system controls 18 run upon entering switcher mode may be a plurality of generator units $G_A$, $G_B$, $G_C$. This default number of generator units $G_A$, $G_B$, $G_C$ may also be a subset of the generator units $G_A$, $G_B$, $G_C$, such as one less than all of the generator units $G_A$, $G_B$, $G_C$. In some embodiments, power-system controls 18 may refrain from ever running all of generator units $G_A$, $G_B$, $G_C$ when executing the first generator-control strategy in switcher mode.

The first generator-control strategy may also involve, after initially running the default number of generator units $G_A$, $G_B$, $G_C$, stopping one or more of the running generator units $G_A$, $G_B$, $G_C$ if predetermined operating conditions related to the electricity requirements of power system 12 occur over a period of time. For example, as shown in FIG. 2C, power-system controls 18 may stop one or more of the running generator units $G_A$, $G_B$, $G_C$ if an electricity requirement of power system 12 remains below a reference value for a reference period of time. After starting the first generator-control strategy with the default number of generator units $G_A$, $G_B$, $G_C$ running, power-system controls 18 may determine whether an electricity requirement of power system 12 falls below the reference value (step 66). Power-system controls 18 may, for example, determine whether the aggregate quantity of electric power required by the first set of electric power loads 24 (electric propulsion motors 20A, 20B) falls below 250 kW. If power-system controls 18 determine that the electricity requirement does not fall below the reference value (step 66), power-system controls 18 may continue running the default number of generator units $G_A$, $G_B$, $G_C$ indefinitely (step 64).

If power-system controls 18 determine that the electricity requirement falls below the reference value, power-system controls 18 may run a timer (step 68). After starting the timer in response to the electricity requirement falling below the reference value, power-system controls 18 may determine whether the elapsed time of the timer exceeds a reference period of time (step 70). If the elapsed time of the timer does not exceed the reference period of time, power-system controls 18 may continue running the default number of generator units $G_A$, $G_B$, $G_C$ (step 64) and repeatedly check whether the electricity requirement remains below the reference value (step 66). If the electricity requirement remains below the reference value long enough for the elapsed time of the timer to exceed the reference period of time (step 70), power-system controls 18 may stop all of generator units $G_A$, $G_B$, $G_C$ except the generator unit $G_A$, $G_B$, $G_C$ with the first priority ranking (step 72).

After stopping all of the generator units $G_A$, $G_B$, $G_C$ except the generator unit $G_A$, $G_B$, $G_C$ with the first priority ranking, power-system controls 18 may check to see if the electricity requirement has risen above the reference value (step 74). If not, power-system controls 18 may continue running only the generator unit $G_A$, $G_B$, $G_C$ with the first priority ranking (step 76). If the electricity requirement does rise back above the reference value (step 74), power-system controls 18 may resume running the default number of generator units $G_A$, $G_B$, $G_C$ (step 64) and monitoring whether the electricity requirement falls below the reference value (step 66).

In addition to selection of which generator units $G_A$, $G_B$, $G_C$ to run, the first generator-control strategy may involve controlling various other aspects of the operation of generator units $G_A$, $G_B$, $G_C$. For example, the first generator-control strategy may involve controlling the rate of change of power output by the power sources $PS_A$, $PS_B$, $PS_C$ and the rate of change of excitation current for the electric generators $EG_{A1}$, $EG_{B1}$, $EG_{C1}$ of the running generator units $G_A$, $G_B$, $G_C$ in response to changes in the electricity requirements of electric propulsion motors 20A, 20B. When executing the first generator-control strategy, power-system controls 18 may increase the power output of the power sources $PS_A$, $PS_B$, $PS_C$ and the excitation current of the electric generators $EG_{A1}$, $EG_{B1}$, $EG_{C1}$ relatively rapidly in response to increases in the electricity requirements of electric propulsion motors 20A, 20B.

Employing the first generator-control strategy in the switcher mode of operation may provide a number of performance advantages. Initially running a plurality of the generator units $G_A$, $G_B$, $G_C$ may allow power system 12 to effectively meet abrupt increases in electricity requirements because increasing the output of the running generator units $G_A$, $G_B$, $G_C$ takes relatively little time compared to starting additional generator units $G_A$, $G_B$, $G_C$. Additionally, by rapidly adjusting the power output of the power sources $PS_A$, $PS_B$, $PS_C$ and the excitation current of the electric generators $EG_{A1}$, $EG_{A2}$, $EG_{A3}$ of the running generator units $G_A$, $G_B$, $G_C$, power-system controls 18 may facilitate rapidly increasing the electric current to electric propulsion motors 20A, 20B when the operator requests increased acceleration. These operating characteristics may prove valuable where machine 10 is a locomotive and the operator uses machine 10 to move railroad cars in a railyard because this task may involve frequent abrupt changes in the quantity of electricity supplied to electric propulsion motors 20A, 20B.

In combination with these performance advantages, the first generator-control strategy may provide other operating advantages. Stopping one or more of generator units $G_A$, $G_B$, $G_C$, if and only if, the electricity requirement remains low for an extended period may avoid unnecessary fuel consumption and wear of generator units $G_A$, $G_B$, $G_C$ during inactive periods without unduly compromising performance during active periods. Additionally, the relatively low speeds at which an operator typically drives machine 10 in a railyard may never require as much power as all of generator units $G_A$, $G_B$, $G_C$ could supply to electric propulsion motors 20A, 20B. Accordingly, by refraining from ever running all of generator units $G_A$, $G_B$, $G_C$ when in switcher mode, power-system controls 18 may reduce fuel consumption, emissions, and wear on generator units $G_A$, $G_B$, $G_C$ without substantially compromising performance.

The first generator-control strategy is not limited to the examples discussed in connection with FIG. 2C. Power-system controls 18 may use different and/or additional criteria for determining whether to stop and/or restart one or more of generator units $G_A$, $G_B$, $G_C$. In some embodiments, power-system controls 18 may use information about the location of machine 10, which may come from position-information system 39, as a factor in determining whether to stop and/or restart one or more of generator units $G_A$, $G_B$, $G_C$. For example, in response to information indicating that machine 10 is in an area for which there are laws regulating when and/or how long engines can idle, power-system controls 18 may respond by controlling generator units $G_A$, $G_B$, $G_C$ in a manner complying with such laws. Additionally, rather than either running the default number of generator units $G_A$, $G_B$, $G_C$ or only one of generator units $G_A$, $G_B$, $G_C$, power-system controls 18 may stop and/or restart the generator units $G_A$, $G_B$, $G_C$ in stages as the electricity requirements of power system 12 change.

Figure 2D:
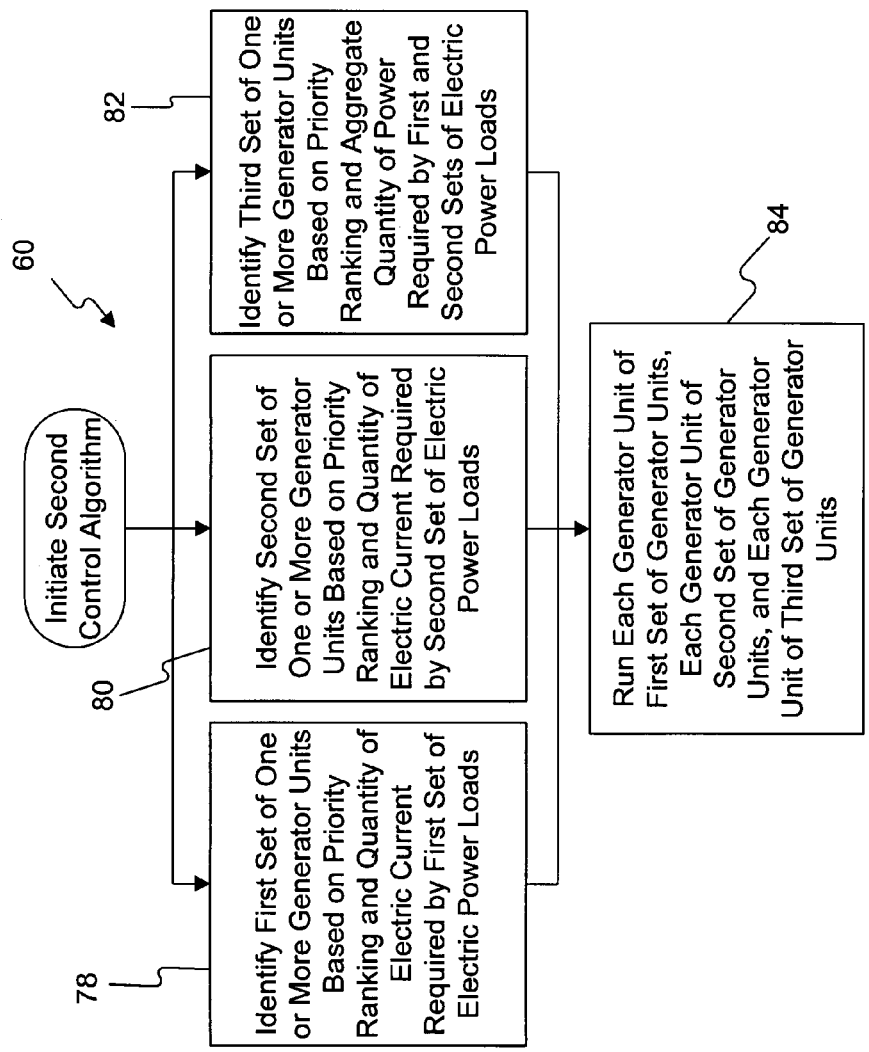
FIG. 2D is a flow chart illustrating another of the processes of the flow chart of FIG. 2A in greater detail.

FIG. 2D illustrates one embodiment of the second generator-control strategy (step 60, FIG. 2A) for use in controlling which of generator units $G_A$, $G_B$, $G_C$ run when in the line-haul mode of operation. When executing the second generator-control strategy, power-system controls 18 may identify a first set of one or more of generator units $G_A$, $G_B$, $G_C$ based on the priority ranking and the quantity of electric current required by the first set of electric power loads 24 (step 78, FIG. 2D). For the first set of one or more of generator units $G_A$, $G_B$, $G_C$, power-system controls 18 may identify one or more generator units $G_A$, $G_B$, $G_C$ whose first electric generators $EG_{A1}$, $EG_{B1}$, $EG_{C1}$ have an aggregate electric current capacity at least equal to the quantity of electric current required by the first set of electric power loads 24. That way, the one or more generator units $G_A$, $G_B$, $G_C$ identified for the first set can meet the electric current requirement of the first set of electric power loads 24.

Power-system controls 18 may use various approaches to identify a set of one or more of generator units $G_A$, $G_B$, $G_C$ capable of at least meeting the electric current requirement of the first set of electric power loads 24. In some embodiments, power-system controls 18 may employ a lookup table that identifies for any given quantity of electric current required by the first set of electric power loads 24 a set of one or more of generator units $G_A$, $G_B$, $G_C$ capable of at least meeting that electric current requirement. FIG. 3A shows one embodiment of such a lookup table. Consider, as an example, circumstances where power-system controls 18 employ the lookup table of FIG. 3A and the first set of electric power loads 24 requires 2,000 amps of electric current. In such circumstances, power-system controls 18 may include in the first set of one or more of generator units $G_A$, $G_B$, $G_C$ the generator units $G_A$, $G_B$, $G_C$ with the first and second priority rankings, but not the generator unit $G_A$, $G_B$, $G_C$ with the third priority ranking.

Power-system controls 18 may also use a lookup table, such as the one shown in FIG. 3A, to determine how much electric current each generator unit $G_A$, $G_B$, $G_C$ in the first set should supply to the first set of electric power loads 24. Consider again the case where the first set of electric power loads 24 requires 2,000 amps of electric current. In such circumstances, power-system controls 18 may use the lookup table of FIG. 3A to determine that the first and second priority generator units $G_A$, $G_B$, $G_C$ should supply 1,250 amps and 750 amps, respectively, to the first set of electric power loads 24.

Returning to FIG. 2D, in addition to identifying the first set of one or more of generator units $G_A$, $G_B$, $G_C$, power-system controls 18 may identify a second set of one or more of generator units $G_A$, $G_B$, $G_C$ based on the priority ranking and the quantity of electric current required by the second set of electric power loads 26 (step 80). For the second set of one or more of generator units $G_A$, $G_B$, $G_C$, power-system controls 18 may identify one or more generator units $G_A$, $G_B$, $G_C$ whose second electric generators $EG_{A2}$, $EG_{B2}$, $EG_{C2}$ have an aggregate electric current capacity at least equal to the quantity of electric current required by the second set of electric power loads 26. That way, the generator units $G_A$, $G_B$, $G_C$ identified for the second set can meet the electric current requirement of the second set of electric power loads 26. As will become clear from the example provided below, the second set of one or more of generator units $G_A$, $G_B$, $G_C$ may include some or all of the generator units $G_A$, $G_B$, $G_C$ identified for the first set of one or more of generator units $G_A$, $G_B$, $G_C$.

Power-system controls 18 may employ a variety of processes to identify a set of one or more of generator units $G_A$, $G_B$, $G_C$ capable of at least meeting the electric current requirement of the second set of electric power loads 26. In some embodiments, power-system controls 18 may use a lookup table that identifies, for any given quantity of electric current required by the second set of electric power loads 26, a set of one or more of generator units $G_A$, $G_B$, $G_C$ capable of supplying at least that much electric current thereto. FIG. 3B shows such a lookup table. Consider, as an example, circumstances where power-system controls 18 employ the lookup table of FIG. 3B and the second set of electric power loads 26 requires 750 amps of electric current. In such circumstances, power-system controls 18 may include in the second set of one or more of generator units $G_A$, $G_B$, $G_C$ the generator unit $G_A$, $G_B$, $G_C$ with the first priority ranking, but not the generator units $G_A$, $G_B$, $G_C$ with the second and third priority rankings. Similar to the lookup table of FIG. 3A, the lookup table of FIG. 3B may also serve as a means for determining how much of the electric current required by the second set of electric power loads 26 each generator unit $G_A$, $G_B$, $G_C$ of the second set of generator units $G_A$, $G_B$, $G_C$ should supply.

In addition to the first and second sets of one or more of generator units $G_A$, $G_B$, $G_C$, power-system controls 18 may identify a third set of one or more of generator units $G_A$, $G_B$, $G_C$ based on the priority ranking and the aggregate quantity of electric power required by the first and second sets of electric power loads 24, 26 (step 82, FIG. 2D). For the third set of one or more of generator units $G_A$, $G_B$, $G_C$, power-system controls 18 may identify one or more generator units $G_A$, $G_B$, $G_C$ with an aggregate power capacity at least equal to the aggregate quantity of electric power required by the first and second sets of electric power loads 24, 26. That way, the one or more generator units $G_A$, $G_B$, $G_C$ identified for the third set will have sufficient power capacity to meet the power requirements of power system 12. Just as the first set and the second set of one or more of generator units $G_A$, $G_B$, $G_C$ may overlap, the third set of one or more of generator units $G_A$, $G_B$, $G_C$ may include one or more of the same generator units $G_A$, $G_B$, $G_C$ as the first set and/or the second set.

Power-system controls 18 may implement various methods of identifying a set of one or more of generator units $G_A$, $G_B$, $G_C$ with an aggregate power capacity at least equal to the aggregate quantity of power required by the first and second sets of electric power loads 24, 26. In some embodiments, power-system controls 18 may employ a lookup table, such as the lookup table shown in FIG. 3C, that identifies, for any given aggregate quantity of electric power required, a set of one or more of generator units $G_A$, $G_B$, $G_C$ with at least that much aggregate power capacity. Consider, as an example, circumstances where power-system controls 18 employ the lookup table of FIG. 3C and the aggregate quantity of electric power required is 250 kW. In such circumstances, power-system controls 18 may include in the third set of one or more of generator units $G_A$, $G_B$, $G_C$ the generator unit $G_A$, $G_B$, $G_C$ with the first priority ranking, but not the generator units $G_A$, $G_B$, $G_C$ with the second and third priority rankings. Similar to the lookup tables of FIGS. 3A and 3B, the lookup table of FIG. 3C may also indicate how to divide the power load amongst the generator units $G_A$, $G_B$, $G_C$ of the third set.

Returning to FIG. 2D, power-system controls 18 may run each generator unit $G_A$, $G_B$, $G_C$ of the first set, each generator unit $G_A$, $G_B$, $G_C$ of the second set, and each generator unit $G_A$, $G_B$, $G_C$ of the third set (step 84). For example, in the exemplary case where the first set includes the first and second priority generator units $G_A$, $G_B$, $G_C$, the second set includes the first priority generator unit $G_A$, $G_B$, $G_C$, and the third set includes the first priority generator unit $G_A$, $G_B$, $G_C$, power-system controls 18 may run the first and second priority generator units $G_A$, $G_B$, $G_C$.

While executing the second generator-control strategy, power-system controls 18 may repeatedly reevaluate which generator units $G_A$, $G_B$, $G_C$ each of the first, second, and third sets of one or more of generator units $G_A$, $G_B$, $G_C$ should include. Accordingly, as the electricity requirements of the various electric power loads 14 change, power-system controls 18 may add one or more of generator units $G_A$, $G_B$, $G_C$ to and/or remove one or more of generator units $G_A$, $G_B$, $G_C$ from the first set, the second set, and/or the third set. As the composition of the first set, the second set, and/or the third set changes, power-system controls 18 may start and/or stop one or more of generator units $G_A$, $G_B$, $G_C$ accordingly.

In some embodiments, when one or more electricity requirements of power system 12 approach the capacity of the running generator units $G_A$, $G_B$, $G_C$ to meet those electricity requirements, power-system controls 18 may start one or more additional generator units $G_A$, $G_B$, $G_C$ to prepare for further load increase. For example, referring to FIG. 3A, when the quantity of electric current required by the first set of electric power loads 24 reaches 1,300 amps, it may approach the capacity of the first priority generator unit $G_A$, $G_B$, $G_C$ to supply electric current thereto. Accordingly, when this occurs, power-system controls 18 may add the second priority generator unit $G_A$, $G_B$, $G_C$ to the first set of one or more of generator units $G_A$, $G_B$, $G_C$ and start the second priority generator unit $G_A$, $G_B$, $G_C$. This may prepare power system 12 to quickly meet the electricity requirements of the first set of electric power loads 24 if the quantity of electric current required by the first set of electric power loads 24 rises beyond the capacity of the first priority generator unit $G_A$, $G_B$, $G_C$ to supply electric current thereto. Power-system controls 18 may similarly start an additional generator unit $G_A$, $G_B$, $G_C$ when the quantity of electric current required by the second set of electric power loads 26 or the aggregate quantity of electric power required approaches the associated capacity of the running generator units $G_A$, $G_B$, $G_C$.

In addition to selection of which generator units $G_A$, $G_B$, $G_C$ to run, the second generator-control strategy may involve controlling various other aspects of the operation of generator units $G_A$, $G_B$, $G_C$. For example, the second generator-control strategy may involve controlling the rate of change of power output by the power sources $PS_A$, $PS_B$, $PS_C$ and the rate of change of excitation current for the electric generators $EG_{A1}$, $EG_{B1}$, $EG_{C1}$ of the running generator units $G_A$, $G_B$, $G_C$ in response to changes in the electricity requirements of electric propulsion motors 20A, 20B. When executing the second generator-control strategy, power-system controls 18 may increase the power output of the power sources $PS_A$, $PS_B$, $PS_C$ and the excitation current of the electric generators $EG_{A1}$, $EG_{B1}$, $EG_{C1}$ less rapidly in response to increases in the electricity requirements of electric propulsion motors 20A, 20B than when executing the first generator-control strategy.

Executing the second generator-control strategy may provide a number of advantages. Using electric current requirements and electric power requirements as separate factors may allow power-system controls 18 to control which of generator units $G_A$, $G_B$, $G_C$ run in a manner that ensures meeting the electricity requirements of electric power loads 14 in widely varying circumstances. Using electric current requirements as a factor may help ensure that power-system controls 18 run enough of generator units $G_A$, $G_B$, $G_C$ to meet the needs of electric power loads 14 in circumstances requiring a large quantity of electric current but a low quantity of electric power. Conversely, using electric power requirements as a factor may help ensure that power-system controls 18 run enough of generator units $G_A$, $G_B$, $G_C$ to meet the needs of electric power loads 14 in circumstances requiring a large quantity of electric power but a low quantity of electric current.

Additionally, the second generator-control strategy accommodates constructing each of generator units $G_A$, $G_B$, $G_C$ with one electric generator $EG_{A1}$, $EG_{B1}$, $EG_{C1}$ for the first set of electric power loads 24 and a separate electric generator $EG_{A2}$, $EG_{B2}$, $EG_{C2}$ for the second set of electric power loads 26 while reliably meeting the electricity requirements of all electric power loads 14. The second generator-control strategy achieves this benefit by using an electricity requirement of the first set of electric power loads 24 and an electricity requirement of the second set of electric power loads 26 as separate factors in determining which of generator units $G_A$, $G_B$, $G_C$ run. By doing so, the second generator-control strategy may ensure that the running generator units $G_A$, $G_B$, $G_C$ have sufficient generating capacity for each of the first and second sets of electric power loads 24, 26.

The second generator-control strategy is not limited to the examples discussed above. For instance, power-system controls 18 may use values other than those shown in FIGS. 3A-3C as the criteria for determining which of generator units $G_A$, $G_B$, $G_C$ to include in the first, second, and third sets of one or more of generator units $G_A$, $G_B$, $G_C$. Additionally, power-system controls 18 may forgo expressly identifying the first, second, and third sets of one or more generator units $G_A$, $G_B$, $G_C$. Instead, power-system controls 18 may use the quantities of electric current required by the first and second sets of electric power loads 24, 26 and the aggregate quantity of electric power required as factors in other methods of controlling which of generator units $G_A$, $G_B$, $G_C$ run to meet all of the electricity requirements of power system 12. For example, power-system controls 18 may use a single lookup table that identifies which of generator units $G_A$, $G_B$, $G_C$ to run for any given quantity of electric current required by the first set of electric power loads 24, quantity of electric current required by the second set of electric power loads 26, and aggregate quantity of electric power required. Furthermore, power-system controls 18 may employ means other than lookup tables, such as equations, to determine which of generator units $G_A$, $G_B$, $G_C$ to run.

Additionally, power-system controls 18 may determine which of generator units $G_A$, $G_B$, $G_C$ to run based on different parameters than those discussed above. Power-system controls 18 may use other parameters in combination with the quantity of electric current required by the first set of electric power loads 24, the quantity of electric current required by the second set of electric power loads 26, and the aggregate quantity of electric power required. Additionally, power-system controls 18 may forgo using one or more of the parameters discussed above as factors in determining which of generator units $G_A$, $G_B$, $G_C$ to run. In some embodiments, power-system controls 18 may determine which of generator units $G_A$, $G_B$, $G_C$ to run based on a single parameter related to the electricity requirements of electric power loads 14, such as the aggregate quantity of electric power required by electric power loads 14.

In some embodiments, power-system controls 18 may use information about the position of machine 10, which may come from position-information system 39, as a factor in controlling these aspects of the operation of power system 12. For example, power-system controls 18 may use information about the location of machine 10 to select one or more lookup tables or equations for use in determining which of generator units $G_A$, $G_B$, $G_C$ to run. Similarly, power-system controls 18 may use one or more lookup tables and/or equations that include information about the location of machine 10 as a factor in determining which of generator units $G_A$, $G_B$, $G_C$ to run. When executing the second generator-control strategy, power-system controls 18 may advantageously use information about the location of machine 10 as a factor in controlling which of generator units $G_A$, $G_B$, $G_C$ to tailor operation of power system 12 in various ways to the location of machine 10. For example, power-system controls 18 may use such location information to tailor operation of power system 12 for hilly or flat terrain. Similarly, power-system controls 18 may use such location information to tailor operation of power system 12 to local laws, such as laws regulating emission of noise and/or pollutants.

Returning to FIG. 2A, while controlling which of generator units $G_A$, $G_B$, $G_C$ run, power-system controls 18 may control the connection of electric propulsion motors 20A, 20B to circuit 28. In switcher mode, power-system controls 18 may use a first motor-connection strategy to control the connection of electric propulsion motors 20A, 20B to circuit 28 (step 59). In line-haul mode, power-system controls 18 may use a second motor-connection strategy to control the connection of electric propulsion motors 20A, 20B to circuit 28 (step 61). In some embodiments, the second motor-connection strategy may involve automatic switching between connection of the electric propulsion motors 20A, 20B of each group 11, 13 to circuit 28 in series and connection of all of electric propulsion motors 20A, 20B to circuit 28 in parallel based on one or more operating conditions. The first motor-connection strategy may differ from the second motor-connection strategy in various ways. In some embodiments, when executing the first motor-connection strategy, power-system controls 18 may switch from series connection of the electric propulsion motors 20A, 20B of each group 11, 13 to parallel connection of all electric propulsion motors 20A, 20B less readily than when executing the second motor-connection strategy.

Figure 2F:
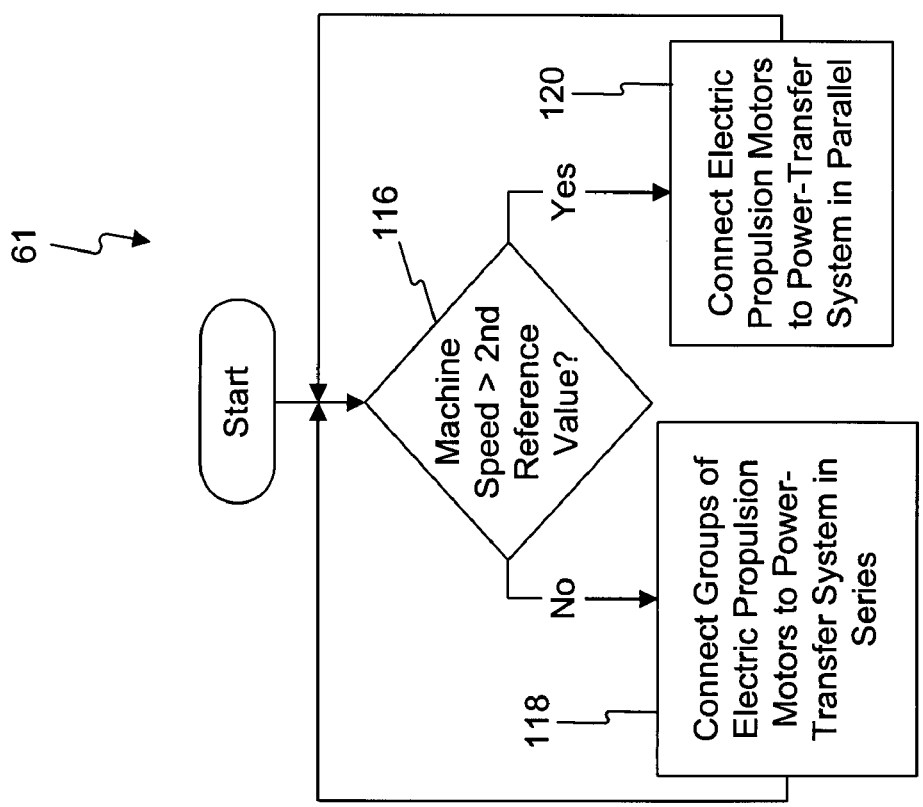
FIG. 2F is a flow chart illustrating one embodiment of another of the processes of the flow chart of FIG. 2A in greater detail.
Figure 2E:
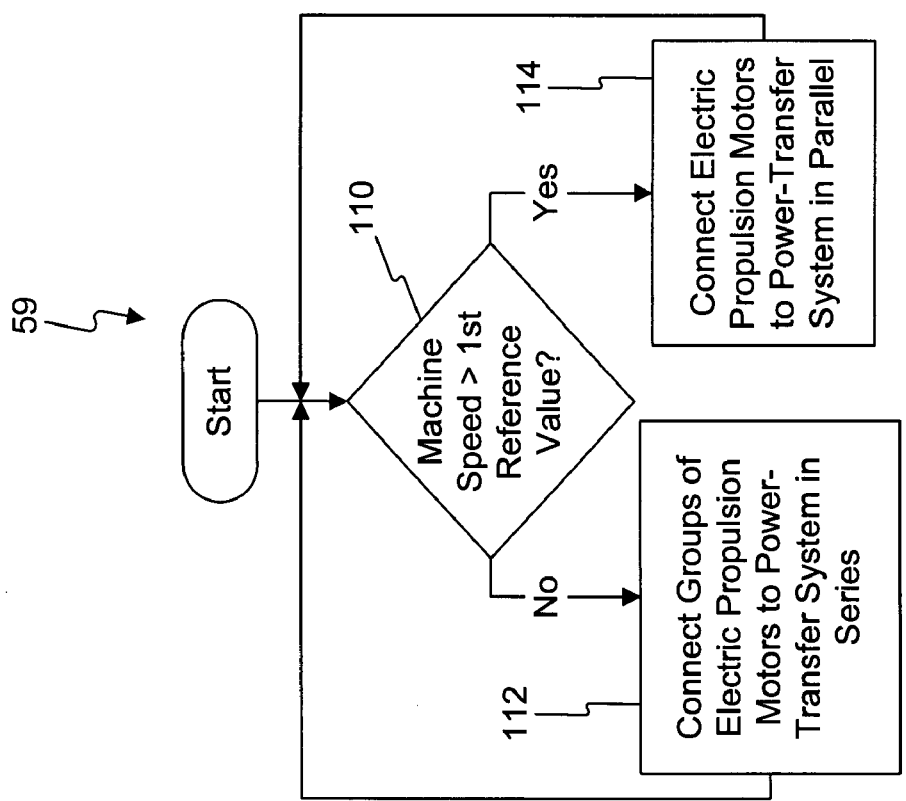
FIG. 2E is a flow chart illustrating one embodiment of another of the processes of the flow chart of FIG. 2A in greater detail.

FIGS. 2E and 2F illustrate one embodiment of the first motor-connection strategy and the second motor-connection strategy, respectively. In this embodiment, when in switcher mode and executing the first motor-connection strategy, power-system controls 18 may compare the speed of machine 10 to a first reference value (step 110), such as 50 miles per hour. If the speed of machine 10 falls below the first reference value, power-system controls 18 may operate switching devices 23, 25 to connect the electric propulsion motors 20A, 20B of each group 11, 13 to circuit 28 in series (step 112). If the speed of machine 10 exceeds the first reference value, power-system controls 18 may control switching devices 23, 25 to connect electric propulsion motors 20A, 20B to circuit 28 in parallel (step 114).

When operating in line-haul mode and executing the second motor-connection strategy, power-system controls 18 may compare the speed of machine 10 to a second reference value (step 116). If the speed of machine 10 falls below the second reference value, power-system controls 18 may control switching devices 23, 25 to connect the electric propulsion motors 20A, 20B of each group 11, 13 to circuit 28 in series (step 118). If the speed of machine 10 exceeds the second reference value, power-system controls 18 may control switching devices 23, 25 to connect electric propulsion motors 20A, 20B to circuit 28 in parallel (step 120).

In some embodiments, the first reference value used as a trigger for switching from series to parallel connection in the first motor-connection strategy may exceed the second reference value used as a trigger for switching from series to parallel connection in the second motor-connection strategy. This may result in power-system controls 18 switching from series to parallel connection less readily when executing the first motor-connection strategy in switcher mode than when executing the second motor-connection strategy in line-haul mode.

Figure 2H:
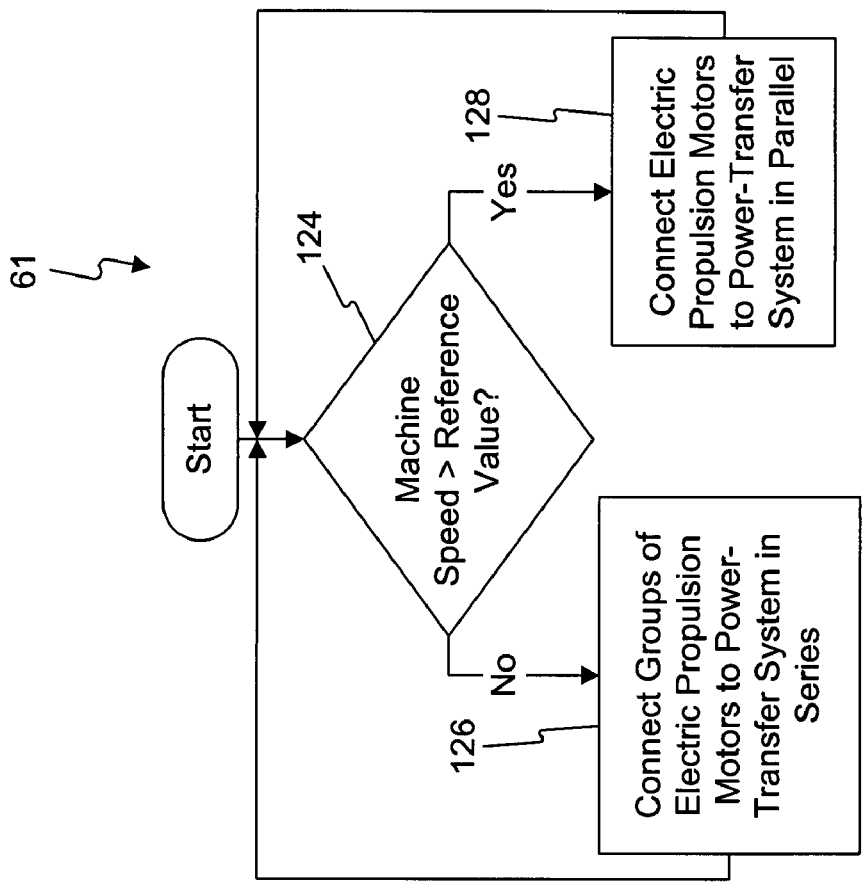
FIG. 2H is a flow chart illustrating another embodiment of the process shown in FIG. 2F.
Figure 2G:
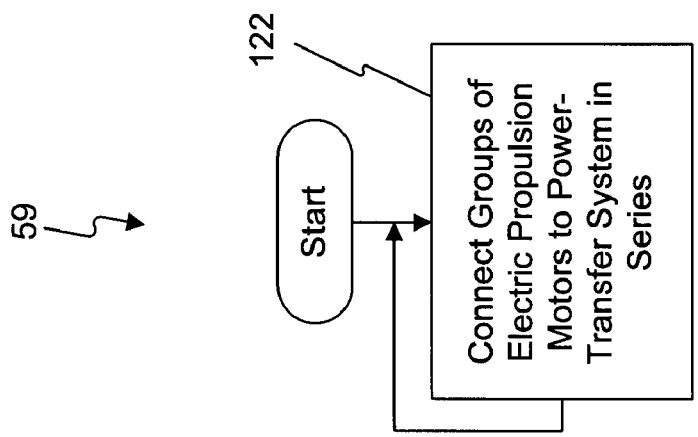
FIG. 2G is a flow chart illustrating another embodiment of the process shown in FIG. 2E.
Figure 2I:
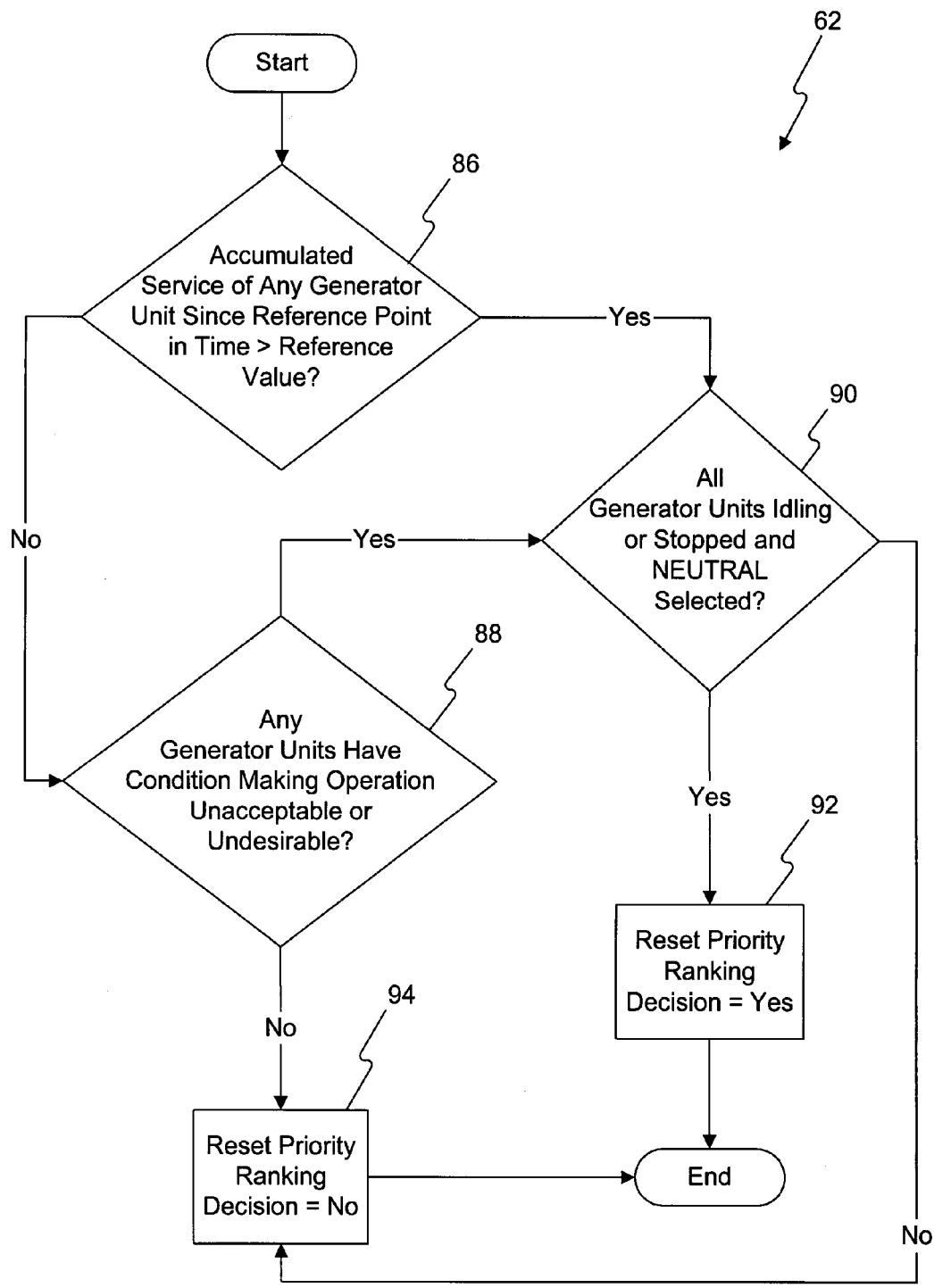
FIG. 2I is a flow chart illustrating another of the processes of the flow chart of FIG. 2A in greater detail.

FIGS. 2G and 2H illustrate another embodiment of the first motor-connection strategy and the second motor-connection strategy, respectively. Similar to the embodiment of the second motor-connection strategy shown in FIG. 2F, the embodiment of the second motor-connection strategy shown in FIG. 2H may include connecting the electric propulsion motors 20A, 20B of each group 11, 13 in series (step 126) if the speed of machine 10 falls below a reference value (step 124), and connecting electric motors 20A, 20B in parallel (step 128) if the speed of machine 10 exceeds the reference value (step 124). In this embodiment, however, when executing the first motor-connection strategy, power-system controls 18 may continually maintain the electric propulsion motors 20A, 20B of each group 11, 13 connected to circuit 28 in series (step 122). Thus, in this embodiment, when operating in switcher mode, power-system controls 18 may never switch from series connection of the electric propulsion motors 20A, 20B of each group 11, 13 to parallel connection of electric propulsion motors 20A, 20B.

The disclosed embodiments of the first motor-connection strategy and the second motor-connection strategy may provide a number of advantages. Operating with the electric propulsion motors 20A, 20B of each group 11, 13 connected in series may provide more electric current to each electric propulsion motor 20A, 20B than operating with electric propulsion motors 20A, 20B connected in parallel. This may help meet the propulsion needs of machine 10 at low travel speeds because electric propulsion motors 20A, 20B may require a large amount of electric current to generate high torque at low speeds. When machine 10 travels at higher speeds, connecting electric propulsion motors 20A, 20B in parallel may ensure that each electric propulsion motor 20A, 20B receives the full voltage of circuit 28. This may help meet the propulsion needs of machine 10 at relatively high travel speeds because each electric propulsion motor 20A, 20B may require relatively high voltage when operating at relatively high travel speeds.

In line-haul mode, the operator may accelerate and decelerate machine 10 only infrequently. Accordingly, the motor-connection strategy used in line-haul mode may implement any appropriate speed of machine 10 as a trigger for switching between series and parallel connection of electric propulsion motors 20A, 20B without causing power-system controls 18 to switch the connection of electric propulsion motors 20A, 20B with undesirable frequency.

In switcher mode, the operator may accelerate and decelerate machine 10 more frequently. By implementing a motor-connection strategy that involves switching from series to parallel connection less readily in switcher mode, the disclosed embodiments may help ensure that power-system controls 18 do not switch the connection of electric propulsion motors 20A, 20B with undesirable frequency when operating in switcher mode.

Additionally, the disclosed embodiments of the first motor-connection strategy and the disclosed embodiments of the first generator-control strategy used in switcher mode may complement one another. When connected in series, the electric propulsion motors 20A, 20B of each group 11, 13 use the same electric current, which reduces the aggregate amount of electric current necessary to provide any given amount of torque. Accordingly, because they tend to keep the electric propulsion motors 20A, 20B of each group 11, 13 connected in series, the disclosed embodiments of the first motor-connection strategy may allow the first generator-control algorithm to provide sufficient electric current for robust performance in switcher mode without running all of generator units $G_A$, $G_B$, $G_C$.

The first motor-connection strategy and the second motor-connection strategy implemented by power-system controls 18 are not limited to the examples provided in FIGS. 2E-2H. For example, the first motor-connection strategy may involve various other approaches that result in switching from series to parallel connection of electric motors 20A, 20B less readily than the second motor-connection strategy. Additionally, in some embodiments, the first motor-connection strategy may not involve switching from series to parallel connection less readily than the second motor-connection strategy. Furthermore, in addition to, or in place of, the speed of machine 10, the first motor-connection strategy and/or the second motor-connection strategy may include using various other parameters as factors for determining whether to connect electric propulsion motors 20A, 20B to circuit 28 in series or in parallel.

Returning to FIG. 2A, as noted above, while executing the first generator-control strategy and the first motor-connection strategy or the second generator-control strategy and the second motor-connection strategy, power-system controls 18 may repeatedly determine whether predetermined conditions that serve as a trigger for resetting the priority ranking of generator units $G_A$, $G_B$, $G_C$ exist (step 62). Power-system controls 18 may implement various approaches for doing so. In some embodiments, the criteria used by power-system controls 18 to determine whether to reset the priority ranking may advance the objectives of balancing the amount of service accumulated by different generator units $G_A$, $G_B$, $G_C$ and limiting or precluding operation of malfunctioning generator units $G_A$, $G_B$, $G_C$. For example, power-system controls 18 may advance these objectives by using the method shown in FIG. 2I to determine whether to reset the priority ranking.

In this method, power-system controls 18 may determine whether the amount of service accumulated by any generator unit $G_A$, $G_B$, $G_C$ since a reference point in time exceeds a reference value (step 86). For this determination, power-system controls 18 may use various parameters as an indication of the amount of service accumulated by each generator unit $G_A$, $G_B$, $G_C$, various events as the reference point in time, and various values as the reference value. In some embodiments, power-system controls 18 may measure accumulated service of each generator unit $G_A$, $G_B$, $G_C$ using a parameter that indicates the actual quantity of work done (the number of units of energy produced) by the generator unit $G_A$, $G_B$, $G_C$, rather than just the number of operating hours. For example, power-system controls 18 may use the quantity of fuel consumed or the quantity of electricity generated by each generator unit $G_A$, $G_B$, $G_C$ as a measure of the amount of service the generator unit $G_A$, $G_B$, $G_C$ has accumulated.

For the reference point in time from which to measure the amount of service accumulated by each generator unit $G_A$, $G_B$, $G_C$, power-system controls 18 may, in some embodiments, use an event other than the first time each generator unit $G_A$, $G_B$, $G_C$ ran. For example, power-system controls 18 may use the last time the priority ranking was set as the reference point in time. Thus, step 86 may involve, for example, determining whether any one of generator units $G_A$, $G_B$, $G_C$ has consumed a quantity of fuel greater than the reference value or generated a quantity of electricity greater than the reference value since the priority ranking was last set. Circumstances where one of generator units $G_A$, $G_B$, $G_C$ has accumulated an amount of service greater than the reference value since the reference point in time may warrant resetting the priority ranking to help balance usage between the different generator units $G_A$, $G_B$, $G_C$.

If power-system controls 18 make a negative determination at step 86, power-system controls 18 may also determine whether any of generator units $G_A$, $G_B$, $G_C$ currently have a condition that makes operation unacceptable or undesirable (step 88). Conditions that may make operation of a generator unit $G_A$, $G_B$, $G_C$ unacceptable may include, for example, a complete failure of a lubrication or cooling system of the generator unit $G_A$, $G_B$, $G_C$. Conditions that may make operation of a generator unit $G_A$, $G_B$, $G_C$ undesirable may include, for example, an undesirable operating state of a lubrication or cooling system not amounting to a complete failure. Conditions making operation of one or more of generator units $G_A$, $G_B$, $G_C$ unacceptable or undesirable may warrant resetting the priority ranking to reduce the rank of those generator units $G_A$, $G_B$, $G_C$ or exclude them from the priority ranking altogether.

If power-system controls 18 make an affirmative determination at step 86 or 88, power-system controls 18 may determine whether all of generator units $G_A$, $G_B$, $G_C$ are idling or stopped and the operator has selected the NEUTRAL operating state of reverser 44 (step 90). If so, power-system controls 18 may elect to reset the priority ranking (step 92).

On the other hand, if power-system controls 18 make a negative determination at both of steps 86 and 88 or at step 90, power-system controls 18 may forgo resetting the priority ranking (step 94). Negative determinations at both of steps 86 and 88 may indicate that conditions do not warrant resetting the priority ranking. A negative determination at step 90 may indicate that the operator may have a critical need for propulsion power at any time. Accordingly, in such circumstances, power-system controls 18 may forgo resetting the priority ranking and focus on controlling generator units $G_A$, $G_B$, $G_C$ to ensure meeting the operator's needs for propulsion power.

Criteria that power-system controls 18 may use to determine when to reset the priority ranking of generator units $G_A$, $G_B$, $G_C$ are not limited to the examples discussed above in connection with FIG. 2I. For example, in some embodiments, power-system controls 18 may disregard whether all of generator units $G_A$, $G_B$, $G_C$ are stopped or idling when determining whether to reset the priority ranking. In such embodiments, power-system controls 18 may reset the priority ranking while one or more of generator units $G_A$, $G_B$, $G_C$ are running at a power level above idle. This may result in power-system controls 18 starting one or more generator units $G_A$, $G_B$, $G_C$ that have risen in the priority ranking and stopping one or more generator units $G_A$, $G_B$, $G_C$ that have fallen in the priority ranking. Power-system controls 18 may do so without interrupting power supply to electric power loads 14 by simultaneously initiating supply of electricity from the newly started generator units $G_A$, $G_B$, $G_C$ and discontinuing supply of electricity from the generator units $G_A$, $G_B$, $G_C$ selected to stop running.

Figure 2J:
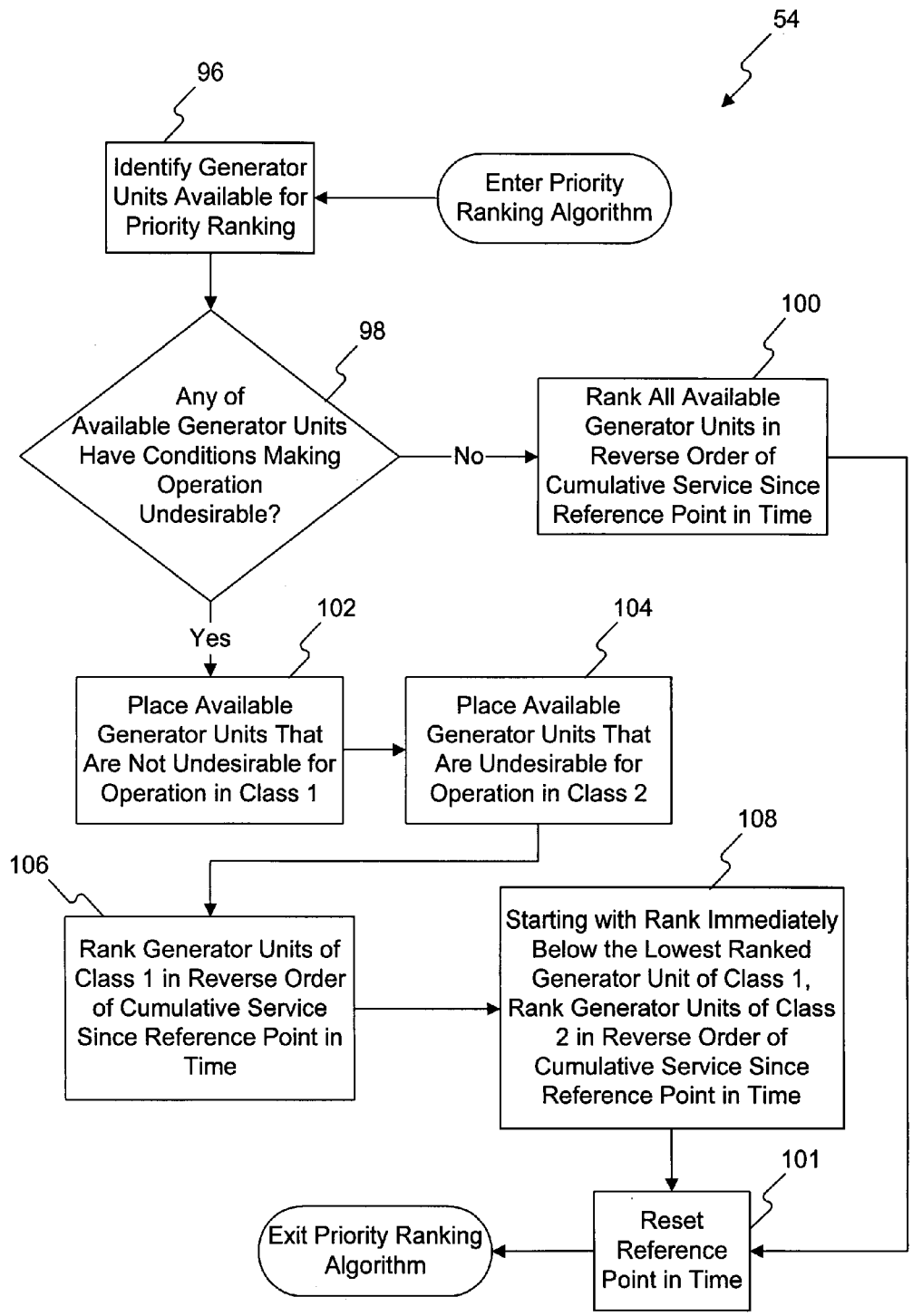
FIG. 2J is a flow chart illustrating another of the processes of the flow chart of FIG. 2A in greater detail.

When power-system controls 18 do set the priority ranking of generator units $G_A$, $G_B$, $G_C$ (step 54, FIG. 2A), power-system controls 18 may use various control methods to do so. FIG. 2J illustrates one control method that power-system controls 18 may use when setting the priority ranking of generator units $G_A$, $G_B$, $G_C$. Power-system controls 18 may first identify which of generator units $G_A$, $G_B$, $G_C$ are available for inclusion in the priority ranking (step 96). Power-system controls 18 may consider unavailable for inclusion in the priority ranking any generator units $G_A$, $G_B$, $G_C$ having conditions that make their operation unacceptable. Additionally, if the operator of machine 10 has used service interface 43 to command power-system controls 18 to exclude any of generator units $G_A$, $G_B$, $G_C$ from operation, power-system controls 18 may consider each of those generator units $G_A$, $G_B$, $G_C$ unavailable for inclusion in the priority ranking.

After identifying which of generator units $G_A$, $G_B$, $G_C$ are available for inclusion in the priority ranking, power-system controls 18 may determine whether any of those generator units $G_A$, $G_B$, $G_C$ have conditions that make operating them undesirable (step 98). If not, power-system controls 18 may rank all of the available generator units $G_A$, $G_B$, $G_C$ in reverse order of the amount of service each has accumulated since the same reference point in time that power-system controls 18 used to determine whether to reset the priority ranking (step 100). In other words, power-system controls 18 may give the first priority ranking to the generator unit $G_A$, $G_B$, $G_C$ that has accumulated the least amount of service since the reference point in time, give the second priority ranking to the generator unit $G_A$, $G_B$, $G_C$ that has accumulated the second lowest amount of service since the reference point in time, and so on.

When ranking each generator unit $G_A$, $G_B$, $G_C$ in the priority ranking, power-system controls 18 may, in some embodiments, measure the accumulated service of each generator unit $G_A$, $G_B$, $G_C$ with the same parameter and from the same reference point in time as used in step 86 (FIG. 2I) in determining whether to reset the priority ranking. Thus, power-system controls 18 may, for example, measure the accumulated service of each generator unit $G_A$, $G_B$, $G_C$ with a parameter that indicates the quantity of work done (number of units of energy produced) by the generator unit $G_A$, $G_B$, $G_C$, such as the quantity of fuel consumed or the quantity of electricity generated. Similarly, power-system controls 18 may use the last time the priority ranking was set as the reference point in time from which the accumulated service of each generator unit $G_A$, $G_B$, $G_C$ is measured when setting the priority ranking.

If power-system controls 18 determine that one or more generator units $G_A$, $G_B$, $G_C$ have conditions that make operating them undesirable (step 98, FIG. 2J), power-system controls 18 may employ a slightly different approach to setting the priority ranking. In such circumstances, power-system controls 18 may place in a first class all of the available generator units $G_A$, $G_B$, $G_C$ that do not have a condition that would make operating them undesirable (step 102). Power-system controls 18 may place in a second class all of the available generator units $G_A$, $G_B$, $G_C$ having conditions that make operating them undesirable (step 104). Power-system controls 18 may then fill the highest positions in the priority ranking with the generator units $G_A$, $G_B$, $G_C$ from the first class ranked in reverse order of the amount of service each has accumulated since the reference point in time (step 106). Subsequently, starting with the rank immediately below the lowest ranked generator unit $G_A$, $G_B$, $G_C$ of the first class, power-system controls 18 may rank the generator units $G_A$, $G_B$, $G_C$ of the second class in reverse order of the amount of service each has accumulated since the reference point in time (step 108).

After establishing the order of all available generator units $G_A$, $G_B$, $G_C$ in the priority ranking (step 100 or steps 106, 108), power-system controls 18 may reset the reference point in time that power-system controls 18 will use to determine whether to reset the priority ranking (step 101). For example, power-system controls 18 may reset the reference point in time to the time at which power-system controls 18 just finished setting the priority ranking.

With the above-discussed methods of setting and resetting a priority ranking of generator units $G_A$, $G_B$, $G_C$ and using the priority ranking to determine which generator units $G_A$, $G_B$, $G_C$ to run, power-system controls 18 may effectively balance usage of the different generator units $G_A$, $G_B$, $G_C$ while meeting the electricity needs of power system 12. Setting a priority ranking for the generator units $G_A$, $G_B$, $G_C$ based on the amount of service each has accumulated over a preceding period may enable evening the service accumulated by the different generator units $G_A$, $G_B$, $G_C$ by preferentially using generator units $G_A$, $G_B$, $G_C$ with higher rank. Additionally, by only resetting the priority ranking when predetermined conditions arise, power-system controls 18 may avoid unnecessarily frequent changes in which of generator units $G_A$, $G_B$, $G_C$ are running. Furthermore, setting the priority ranking based on a parameter that indicates the actual amount of work done by each generator unit $G_A$, $G_B$, $G_C$ may balance the actual wear accumulated by the different generator units $G_A$, $G_B$, $G_C$ better than using a parameter such as operating hours.

Additionally, using an event other than the time each generator unit $G_A$, $G_B$, $G_C$ first ran as the reference point in time for setting the priority ranking may provide certain advantages. For example, this approach may prove beneficial in circumstances where one or more of generator units $G_A$, $G_B$, $G_C$ have accumulated a large amount of service since they first ran and the operator replaces one or more of the generator units $G_A$, $G_B$, $G_C$ with a new or nearly new unit. In such circumstances, if power-system controls 18 used the first time each generator unit $G_A$, $G_B$, $G_C$ ran as the reference point for setting the priority ranking, the new or nearly new generator unit $G_A$, $G_B$, $G_C$ could end up with the first priority ranking every time, initially. This could result in the new or nearly new generator unit $G_A$, $G_B$, $G_C$ accumulating much more service in the short run, which could force the operator to service the new or nearly new generator unit $G_A$, $G_B$, $G_C$ more frequently than if power-system controls 18 balance the usage of all of generator units $G_A$, $G_B$, $G_C$ in the short term. Power-system controls 18 may balance short-term usage of each generator unit $G_A$, $G_B$, $G_C$ effectively by setting the priority ranking based on the amount of service accumulated by each generator unit $G_A$, $G_B$, $G_C$ since some event closer in time than the first time each generator unit $G_A$, $G_B$, $G_C$ ran.

Methods of controlling power system 12 are not limited to the examples discussed above in connection with FIGS. 2A-2J and 3A-3C. Power-system controls 18 may use the principles of the control methods disclosed above to control more than or less than three generator units $G_A$, $G_B$, $G_C$. Additionally, in controlling which of generator units $G_A$, $G_B$, $G_C$ run, power-system controls 18 may perform the actions discussed above in different orders, omit one or more of the actions discussed above, perform actions other than those discussed above, and/or perform one or more of the actions discussed above in different manners. In embodiments where operator interface omits manual propulsion-mode selector 48, power-system controls 18 may always automatically select between the first and second generator-control strategies and the first and second motor-connection strategies. Additionally, in some embodiments, power-system controls 18 may use the same control algorithm in all circumstances to determine which of generator units $G_A$, $G_B$, $G_C$ to run, rather than selecting between the first and second generator-control strategies discussed above. Alternatively, in some embodiments, power-system controls 18 may have more than two control strategies for determining which of generator units $G_A$, $G_B$, $G_C$ to run in different circumstances. Similarly, power-system controls 18 may have a single strategy for controlling the connection of electric propulsion motors 20A, 20B to power-transfer system 17, or power-system controls 18 may select from more than two strategies for controlling the connection of electric propulsion motors 20A, 20B to power-transfer system 17.

Additionally, the methods of setting and resetting the priority ranking of generator units $G_A$, $G_B$, $G_C$ are not limited to the examples discussed above. In some embodiments, power-system controls 18 may use additional criteria for determining the order of generator units $G_A$, $G_B$, $G_C$ in the priority ranking. For example, in addition to the total amount of service accumulated by each generator unit $G_A$, $G_B$, $G_C$ since the reference point in time, power-system controls 18 may use the amount of service accumulated by each generator unit $G_A$, $G_B$, $G_C$ when operating at certain power levels, such as low power levels, as another factor in determining the priority ranking.

Additionally, power-system controls 18 may employ different techniques for addressing generator units $G_A$, $G_B$, $G_C$ having conditions that make operating them unacceptable or undesirable. In some embodiments, for example, power-system controls 18 may place all of the generator units $G_A$, $G_B$, $G_C$ in the priority ranking without regard to whether they have conditions that make operating them unacceptable or undesirable. In such embodiments, power-system controls 18 might control which of generator units $G_A$, $G_B$, $G_C$ run by electing to run a generator unit $G_A$, $G_B$, $G_C$ with a higher position in the priority ranking in preference to a generator unit $G_A$, $G_B$, $G_C$ with a lower position in the priority ranking, while skipping any generator units $G_A$, $G_B$, $G_C$ having conditions making their operation unacceptable or undesirable. In such embodiments, power-system controls 18 might, for example, run generator units $G_A$, $G_B$, $G_C$ having conditions that make operating them undesirable if the other generator units $G_A$, $G_B$, $G_C$ have insufficient capacity to meet the electricity requirements of electric power loads 14.

Furthermore, in some embodiments, power-system controls 18 may use one set of criteria for setting the priority ranking one time and a different set of criteria for setting the priority ranking another time. For example, rather than always setting the priority ranking based on the amount of service accumulated by each generator unit $G_A$, $G_B$, $G_C$ since the last time the priority ranking was set, power-system controls 18 may occasionally use a longer interval of service as the basis for the priority ranking or set the priority ranking randomly. Either of these techniques may help ensure that no one generator unit $G_A$, $G_B$, $G_C$ perpetually receives the second priority ranking.

It will be apparent to those skilled in the art that various modifications and variations can be made in the power system and methods without departing from the scope of the disclosure. Other embodiments of the disclosed power system and methods will be apparent to those skilled in the art from consideration of the specification and practice of the power system and methods disclosed herein. It is intended that the specification and examples be considered as exemplary only, with a true scope of the disclosure being indicated by the following claims and their equivalents.

What is claimed is:

1. A mobile machine, comprising:
   one or more generator units;
   a plurality of electric propulsion motors;
   a power-transfer system operable to transfer electricity from one or more of the generator units to one or more of the electric propulsion motors; and
   power-system controls that control the connection of the one or more electric propulsion motors to the power-transfer system, including, while supplying electricity to the plurality of electric propulsion motors to propel the mobile machine:
      selectively using a first motor-connection strategy for controlling when one or more groups of the electric propulsion motors are connected to the power-transfer system in series, wherein using the first motor connection strategy includes selectively switching between series connection and parallel connection of one or more of the electric propulsion motors, and
      selectively using a second motor-connection strategy for controlling when one or more groups of the electric propulsion motors are connected to the power-transfer system in series, wherein using the second motor connection strategy includes selectively switching between series connection and parallel connection of one or more of the electric propulsion motors.

2. The mobile machine of claim 1, wherein:
   the first motor-connection strategy includes connecting one or more groups of the electric propulsion motors to the power-transfer system in series when a speed of the mobile machine is below a first reference value; and
   the second motor-connection strategy includes connecting one or more groups of the electric propulsion motors to the power-transfer system in series when a speed of the mobile machine is below a second reference value.

3. The mobile machine of claim 2, wherein:
   the first reference value is higher than the second reference value; and
   the power-system controls are operable to automatically use the first motor-connection strategy when the mobile machine is disposed in a railyard.

4. The mobile machine of claim 2, wherein the power-system controls are operable to automatically select the first motor-connection strategy or the second motor-connection strategy based at least in part on the location of the mobile machine.

5. The mobile machine of claim 1, wherein:
   the first motor-connection strategy includes continuously maintaining one or more groups of the electric propulsion motors connected to the power-transfer system in series; and
   the second motor-connection strategy includes selectively switching between connection of one or more groups of the electric propulsion motors to the power-transfer system in series and connection of those electric propulsion motors to the power-transfer system in parallel.

6. The mobile machine of claim 5, wherein the power-system controls are operable to automatically use the first motor-connection strategy when the mobile machine is disposed in a railyard.

7. The mobile machine of claim 1, wherein the power-system controls are operable to automatically select the first motor-connection strategy or the second motor-connection strategy based at least in part on the location of the mobile machine.

8. The mobile machine of claim 1, wherein the power-system controls are operable to automatically select the first motor-connection strategy or the second motor-connection strategy based at least in part on the location of the mobile machine relative to a railyard.

9. The mobile machine of claim 1, wherein:
   the power-system controls use a first generator-control strategy to control the one or more generator units when using the first motor-connection strategy; and
   the power-system controls use a second generator-control strategy to control the one or more generator units when using the second motor-connection strategy.

10. A method of operating a mobile machine, the method comprising:
    generating electricity with one or more generator units;
    supplying electricity from one or more of the generator units to a first electric propulsion motor and a second electric propulsion motor of the mobile machine; and
    controlling whether the first electric propulsion motor and the second electric propulsion motor are connected in series or in parallel based at least in part on the location of the mobile machine, including
       when the mobile machine is in a first area, using a first motor-connection strategy for controlling whether the first electric propulsion motor and the second electric propulsion motor are connected in series or in parallel; and
       when the mobile machine is in a second area, using a second motor-connection strategy for controlling whether the first electric propulsion motor and the second electric propulsion motor are connected in series or in parallel.

11. The method of claim 10, wherein controlling whether the first electric propulsion motor and the second electric propulsion motor are connected in series or in parallel based at least in part on the location of the mobile machine includes controlling whether the first electric propulsion motor and the second electric propulsion motor are connected in series or in parallel based at least in part on the location of the mobile machine relative to a railyard.

12. The method of claim 10, wherein:
    using the first motor-connection strategy includes, when the speed of the mobile machine increases from below a first reference value to above the first reference value, switching from series connection of the first electric propulsion motor and the second electric propulsion motor to parallel connection of the first electric propulsion motor and the second electric propulsion motor; and using the second motor-connection strategy includes leaving the first electric propulsion motor and the second electric propulsion motor connected in series when the speed of the mobile machine increases from below the first reference value to above the first reference value.

13. The method of claim 10, wherein controlling whether the first electric propulsion motor and the second electric propulsion motor are connected in series or in parallel based at least in part on the location of the mobile machine includes controlling whether the first electric propulsion motor and the second electric propulsion motor are connected in series or in parallel based at least in part on the location of the mobile machine in combination with the speed of the mobile machine.

14. The method of claim 10, further including controlling the one or more generator units based at least in part on the location of the mobile machine.

15. A method of operating a mobile machine, the method comprising:
selectively generating electricity with one or more of a plurality of generator units that include a plurality of engines of the mobile machine, including
selectively using a first generator-control strategy to control which of the engines of the generator units run, including refraining from running all of the engines of the generator units at any time when using the first generator-control strategy;
selectively using a second generator-control strategy to control which of the engines of the generator units run, including running all of the engines of the generator units in at least some circumstances when using the second generator-control strategy; and
selectively supplying electricity from one or more of the generator units to one or more electric propulsion motors of the mobile machine.

16. The method of claim 15, wherein selectively using the first generator-control strategy and selectively using the second generator-control strategy includes selecting which of the first generator-control strategy and the second generator-control strategy to use based at least in part on the location of the mobile machine.

17. The method of claim 15, wherein selectively using the first generator-control strategy and selectively using the second generator-control strategy includes selecting which of the first generator-control strategy and the second generator-control strategy to use based at least in part on the location of the mobile machine relative to a railyard.

18. The method of claim 15, wherein:
selectively using the first generator-control strategy includes using the first generator-control strategy in a first operating mode of the mobile machine;
selectively using the second generator-control strategy includes using the second generator-control strategy in a second operating mode of the mobile machine; and
selectively supplying electricity from one or more of the generator units to one or more of the electric propulsion motors includes supplying the electricity to the one or more electric propulsion motors in a manner based at least in part on the operating mode of the mobile machine.

19. The method of claim 15, wherein using the first generator-control strategy further includes adjusting excitation current in one or more electric generators of the generator units more rapidly in response to changing electricity needs than when using the second generator-control strategy.

* * * * *